United States Patent
Bourne et al.

(10) Patent No.: US 10,969,216 B2
(45) Date of Patent: *Apr. 6, 2021

(54) ADAPTIVE CONTROL OF COATING THICKNESS

(71) Applicant: Rolls-Royce North American Technologies, Inc., Indianapolis, IN (US)

(72) Inventors: Keith Bourne, Chester, VA (US); Matthew R. Gold, Carmel, IN (US); Benjamin Zimmerman, Moseley, VA (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 239 days.

This patent is subject to a terminal disclaimer.

(21) Appl. No.: 16/054,705

(22) Filed: Aug. 3, 2018

(65) Prior Publication Data

US 2019/0041192 A1 Feb. 7, 2019

Related U.S. Application Data

(60) Provisional application No. 62/541,394, filed on Aug. 4, 2017, provisional application No. 62/541,397, filed on Aug. 4, 2017.

(51) Int. Cl.
*G01B 11/06* (2006.01)
*G01B 21/08* (2006.01)
(Continued)

(52) U.S. Cl.
CPC ........ *G01B 11/0683* (2013.01); *B05B 1/3033* (2013.01); *B05B 7/226* (2013.01);
(Continued)

(58) Field of Classification Search
CPC .................... G01B 11/0683; B05B 7/226
See application file for complete search history.

(56) References Cited

U.S. PATENT DOCUMENTS

2011/0276166 A1* 11/2011 Atanasoff .......... G01B 11/0683
700/104
2012/0156362 A1* 6/2012 Sadovoy ............... B25J 9/1671
427/9
(Continued)

FOREIGN PATENT DOCUMENTS

DE 102014220180 A1 6/2016
WO 2017032518 A1 3/2017

OTHER PUBLICATIONS

U.S. Appl. No. 16/054,651, filed Aug. 3, 2018, by Bourne et al.
(Continued)

*Primary Examiner* — Nathan T Leong
(74) *Attorney, Agent, or Firm* — Shumaker & Sieffert, P.A.

(57) ABSTRACT

An example method that includes receiving a geometry of a component that includes a plurality of locations on a surface of the component; determining a first target trajectory including a first plurality of target trajectory points and a second target trajectory including a second plurality of target trajectory points, the first and second trajectories offset in a first direction, and the first and second plurality of trajectory points offset in a second direction; determining a respective target coating thickness of the coating based on a target coated component geometry and the geometry; and determining a respective motion vector of a coating device based on the first and second target trajectories to deposit the respective target coating thickness.

10 Claims, 11 Drawing Sheets

(51) Int. Cl.
| | | |
|---|---|---|
| B05B 13/04 | (2006.01) | |
| B05B 12/04 | (2006.01) | |
| B05B 7/22 | (2006.01) | |
| G01B 11/24 | (2006.01) | |
| B05B 16/00 | (2018.01) | |
| C23C 4/12 | (2016.01) | |
| C23C 24/04 | (2006.01) | |
| B05B 12/00 | (2018.01) | |
| B05B 12/12 | (2006.01) | |
| F01D 5/28 | (2006.01) | |
| B05B 12/08 | (2006.01) | |
| C23C 4/00 | (2016.01) | |
| B05B 1/30 | (2006.01) | |
| G06F 17/17 | (2006.01) | |
| C23C 4/134 | (2016.01) | |
| C23C 4/04 | (2006.01) | |
| C23C 4/131 | (2016.01) | |
| B05B 7/00 | (2006.01) | |
| B05B 7/20 | (2006.01) | |
| G01B 21/20 | (2006.01) | |

(52) U.S. Cl.
CPC ............ *B05B 12/004* (2013.01); *B05B 12/04* (2013.01); *B05B 12/084* (2013.01); *B05B 12/122* (2013.01); *B05B 13/0431* (2013.01); *B05B 16/00* (2018.02); *C23C 4/00* (2013.01); *C23C 4/12* (2013.01); *C23C 24/04* (2013.01); *F01D 5/284* (2013.01); *F01D 5/288* (2013.01); *G01B 11/24* (2013.01); *G01B 21/08* (2013.01); *G06F 17/17* (2013.01); *B05B 7/0006* (2013.01); *B05B 7/20* (2013.01); *B05B 7/222* (2013.01); *C23C 4/04* (2013.01); *C23C 4/131* (2016.01); *C23C 4/134* (2016.01); *F05D 2230/90* (2013.01); *F05D 2300/6033* (2013.01); *F05D 2300/611* (2013.01); *G01B 21/20* (2013.01)

(56) References Cited

U.S. PATENT DOCUMENTS

| | | | | |
|---|---|---|---|---|
| 2015/0140199 | A1* | 5/2015 | Borchardt | B05B 12/00 427/8 |
| 2015/0315714 | A1* | 11/2015 | Vijay | B05B 1/08 205/89 |

OTHER PUBLICATIONS

U.S. Appl. No. 16/054,674, filed Aug. 3, 2018, by Bourne et al.
U.S. Appl. No. 16/054,736, filed Aug. 3, 2018, by Bourne et al.
Antonio, "Optimal Trajectory Planning for Spray Coating", TR-EE 93-29, Sep. 1993, 44 pgs.
Byrd et al., "A Limited Memory Algorithm for Bound Constrained Optimization" May 1994, Technical Report NAM-08, 25 pgs.
Ramabhadran et al., "Fast Solution Techniques for a Class of Optimal Trajectory Planning Problems with Applications to Automated Spray Coating", TR-EE 95-9, Mar. 1995, 38 pgs.
Antonio et al., "A Framework for Optimal Trajectory Planning for Automated Spray Coating", International Journal of Robotics and Automation, vol. 12, No. 4, 1997, 11 pgs. Applicant points out, in accordance with MPEP 609.04(a), that the year of publication, 1997, is sufficiently earlier than the effective U.S. filing date, 2018 so that the particular month of publication is not in issue.
Atkar et al., "Uniform Coverage of Simple Surfaces Embedded in R3 for Auto-Body Painting" 2004, 16 pgs. Applicant points out, in accordance with MPEP 609.04(a), that the year of publication, 2004, is sufficiently earlier than the effective U.S. filing date, 2018 so that the particular month of publication is not in issue.
Kout et al., "Parameter optimization for spray coating", Apr. 2009, Advances in Engineering Software 40 (2009) 1078-1086, 9 pgs.
Gadow et al., "Optimizied robot trajectory generation for thermal spraying operations and high quality coatings on free-form surfaces", Sep. 2010, Surface & Coatings Technology 205 (2010) 1074-1079, 6 pgs.
Deng et al., "Application of robot offline programming in thermal spraying", Mar. 2012, Surface & Coatings Technology 206 (2012) 3875-3882, 8 pgs.
Sadovoy, "Modeling and offline simulation of thermal spray coating process for gas turbine applications", 2014, 109 pgs. Applicant points out, in accordance with MPEP 609.04(a), that the year of publication, 2014, is sufficiently earlier than the effective U.S. filing date, 2018 so that the particular month of publication is not in issue.
Hegels et al., "Simulation based iterative post-optimization of paths of robot guided thermal spraying" Mar. 2015, Robotics and Computer-Integrated Manufacturing 35 (2015) 1-15, 15 pgs.
Antonio, "Optimal Trajetory Planning for Spray Coating", 1994, IEEE, 8 pgs. Applicant points out, in accordance with MPEP 609.04(a), that the year of publication, 1994, is sufficiently earlier than the effective U.S. filing date, 2018 so that the particular month of publication is not in issue.
Office Action from U.S. Appl. No. 16/054,674, dated Aug. 31, 2020, 7 pp.
Office Action from U.S. Appl. No. 16/054,651, dated Aug. 31, 2020, 6 pp.
Office Action from U.S. Appl. No. 16/054,736, dated Aug. 31, 2020, 7 pp.
Notice of Allowance from U.S. Appl. No. 16/054,651, dated Dec. 10, 2020, 8 pages.
Response to Office Action dated Aug. 31, 2020, from U.S. Appl. No. 16/054,651, filed Nov. 30, 2020, 3 pages.
Notice of Allowance from U.S. App. No. 16/054,674, dated Dec. 10, 2020, 8 pages.
Response to Office Action dated Aug. 31, 2020, from U.S. App. No. 16/054,674, filed Nov. 30, 2020, 4 pages.
Notice of Allowance from U.S. Appl. No. 16/054,736, dated Dec. 11, 2020, 8 pages.
Response to Office Action dated Aug. 31, 2020, from U.S. Appl. No. 16/054,736, 4 pages.

* cited by examiner

ADAPTIVE CONTROL OF COATING THICKNESS

This application claims the benefit of U.S. Provisional Application No. 62/541,394, filed Aug. 4, 2017, and U.S. Provisional Application No. 62/541,397, filed Aug. 4, 2017, which are incorporated herein by reference in their entirety.

TECHNICAL FIELD

The present disclosure generally relates to systems and techniques for adaptive control of a thickness of a coating applied to a component.

BACKGROUND

The components of high-temperature mechanical systems, such as, for example, gas turbine engines, operate in severe environments. For example, the high-pressure turbine blades and vanes exposed to hot gases in commercial aeronautical engines typically experience surface temperatures of about 1000° C., with short-term peaks as high as 1100° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy substrates may be coated with a thermal barrier coating to reduce heat transfer from the external environment to the superalloy substrate. Ceramic or CMC substrates may be coated with an environmental barrier coating to reduce exposure of the ceramic or CMC substrate to environmental species, such as oxygen or water vapor. Additionally, certain components may include other functional coatings, such as, for example, bond coatings to improve adhesion between the substrate and adjacent coating layers, abradable coatings for forming seals between moving parts, abrasive coatings to provide toughness to moving components that may contact abradable coatings, or the like.

SUMMARY

In some examples, the disclosure describes a method that includes receiving, by a computing device, a geometry of a component that includes a plurality of locations on a surface of the component. The method also includes determining, by the computing device, a first target trajectory comprising a first plurality of target trajectory points based on the plurality of locations and a second target trajectory comprising a second plurality of target trajectory points based on the plurality of locations, wherein the first trajectory and the second trajectory are offset in a first direction relative to each other, and wherein the plurality of first trajectory points and the plurality of second trajectory points are offset in a second direction relative to each other. The method also includes determining, by the computing device, a respective target coating thickness of a coating for each respective location of the plurality of locations based on a target coated component geometry and the geometry of the component. The method also includes determining, by the computing device, a respective motion vector of a coating device relative to the component for each first target trajectory point of the plurality of first target trajectory points based on the first target trajectory and each second target trajectory point of the plurality of second target trajectory points based on the second target trajectory to define a path of the coating device. The respective motion vector may include a respective direction vector and a respective velocity of the coating device relative to the component.

In some examples, the disclosure describes a system that includes a measuring device configured to measure a three-dimensional surface geometry of the component; a coating device configured to direct a coating material to a surface of the component to form the coating; and a computing device. The computing device is configured to receive, from the measuring device, a geometry of the component that includes a plurality of locations on a surface of the component. The computing device also is configured to determine a first target trajectory comprising a first plurality of target trajectory points based on the plurality of locations and a second target trajectory comprising a second plurality of target trajectory points based on the plurality of locations, wherein the first trajectory and the second trajectory are offset in a first direction relative to each other, and wherein the plurality of first trajectory points and the plurality of second trajectory points are offset in a second direction relative to each other. The computing device also is configured to determine a respective target coating thickness of the coating for each respective location of the plurality of locations based on a target coated component geometry and the geometry of the component. The computing device also is configured to determine a respective motion vector of a coating device relative to the component for each first target trajectory point of the plurality of first target trajectory points based on the first target trajectory and each second target trajectory point of the plurality of second target trajectory points based on the second target trajectory to define a path of the coating device. The computing device also is configured to determine a respective velocity of the coating device relative to the component for each first target trajectory point of the plurality of first target trajectory points and each second target trajectory point of the plurality of second target trajectory points to deposit the respective target coating thickness for each respective location.

The details of one or more examples are set forth in the accompanying drawings and the description below. Other features, objects, and advantages will be apparent from the description and drawings, and from the claims.

DETAILED DESCRIPTION

Figure 1:
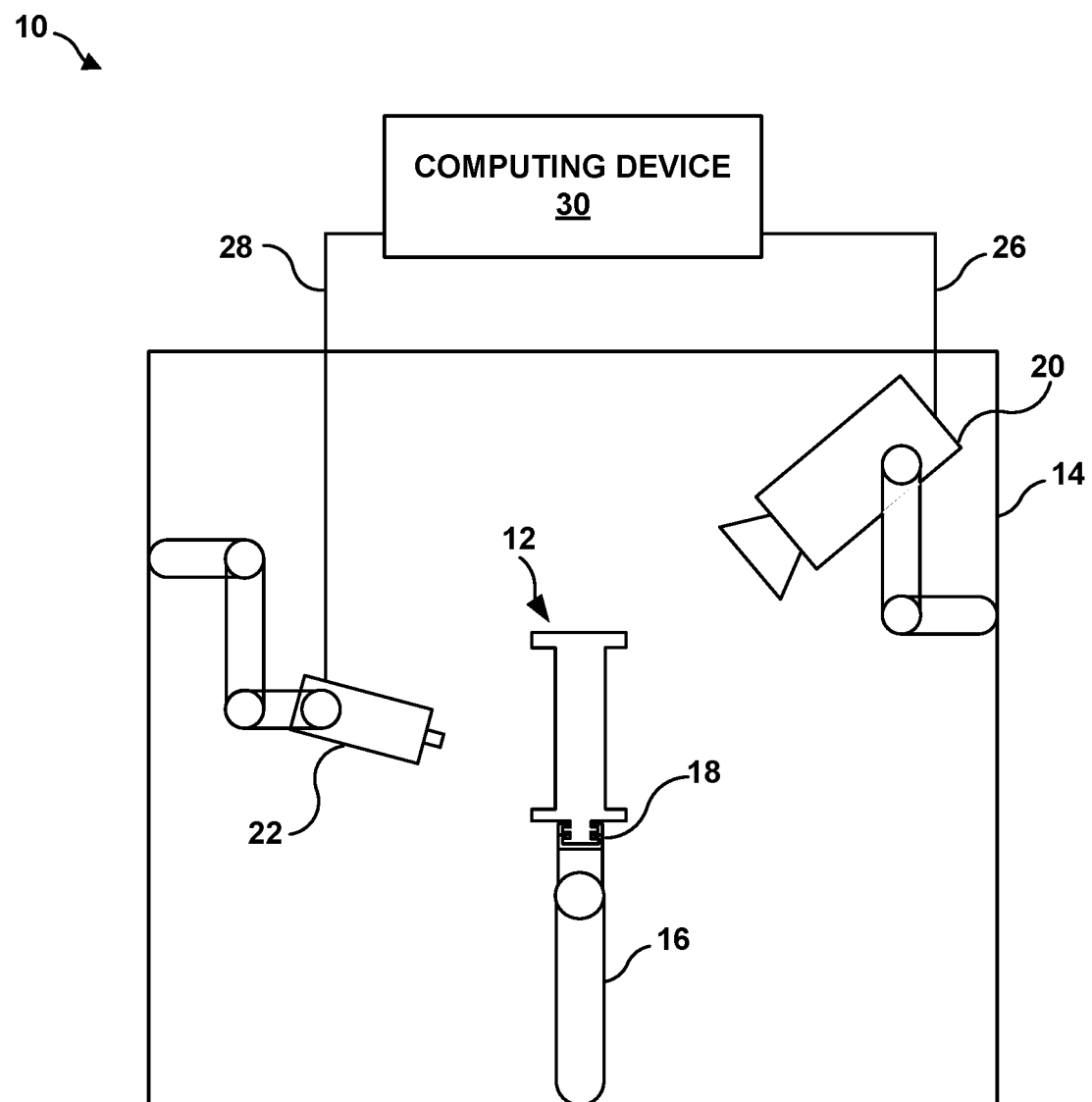
FIG. 1 is conceptual and schematic block diagram illustrating an example system for adaptive control of a thickness of a coating applied to a component.

The components of high-temperature mechanical systems, such as, for example, gas turbine engines, may include a superalloy substrate, a ceramic substrate, a CMC substrate, or the like. These components may be manufactured to meet a geometric tolerance, for example, to withstand the mechanical forces of high-temperature mechanical systems or to fit with small gaps or spaces to adjacent components. For example, some gas turbine engine components, e.g., turbine blades, may be manufactured to meet a geometric tolerance to balance a compressor stage during operation or achieve relatively small gaps between a blade tip and a surrounding blade track or blade shroud. Achieving geometric tolerances may contribute to the performance of a high-temperature mechanical systems.

Also, components of high-temperature mechanical systems may include one or more coatings, for example, to facilitate operation in the high-temperature environment of high-temperature mechanical systems. For example, gas turbine engine components may include at least one of a bond coat, a calcia-magnisia-aluminosilicate (CMAS)-resistance layer, an environmental barrier coating (EBC), a thermal barrier coating (TBC), an abradable coating, an abrasive coating, or the like. Each of the one or more coatings may have unique mechanical properties, chemical properties, or both to contribute to the performance of a high-temperature mechanical system component. For example, EBCs may be reduce the migration into the substrate of elements or compounds, e.g., oxygen and water vapor, that may damage and reduce the useful life of the substrate.

Application of a coating to a surface of a component may affect a geometric tolerance of the component. For example, application of a coating may fill depressions in a surface to bring the surface closer to the geometric tolerance, or accumulate on peaks or crests to bring the surface further out of tolerance. Controlling a thickness of a coating directed to a surface of a component, where the surface is out of tolerance, such that the resulting coated component meets the geometric tolerance may reduce material waste, manufacturing time, and manufacturing expense compared to other coating methods, top coat machining methods, or both. Therefore, it may be useful to direct a coating of variable thickness to surface of a component to meet a geometric tolerance.

In some examples, controlling the thickness of the coating may include defining a plurality of target trajectory points on the surface of the component. Each respective target trajectory point of the plurality of target trajectory points may define a point at which motion of the coating device is controlled and may include a respective target region associated with the respective target trajectory point. A coating system may define a target trajectory including a plurality of target trajectory points. At each target trajectory point, the computing device may define a motion vector, including direction and velocity, that controls movement of the coating device at that target trajectory point. For example, when a coating device (e.g., plume of the spray gun) enters a first target region defined by a first target trajectory point, the coating system may control the coating device to move in a selected direction at a selected velocity toward a second target trajectory point. As the coating device has mass and power of motors are limited, the spacing of target trajectory points may be limited while allowing the coating device to be accelerated to the control velocity.

This process may be repeated for the plurality of target trajectory points defining the target trajectory, and for a plurality of target trajectories to coat a component. In some examples, the position of the plurality of target trajectory points on the surface of the component may be selected to improve control of the velocity of the coating device. For example, a first target trajectory including a first plurality of target trajectory points and a second target trajectory including a second plurality of target trajectory points may be offset in a first direction relative to each other, and the plurality of first trajectory points and the plurality of second trajectory points may be offset in a second direction relative to each other. The offset arrangement of the first plurality of target trajectory points and the second plurality of target trajectory points may improve the effective resolution of the coating device relative to the surface of the component by reducing a spacing between adjacent points in the second direction (when considering two target trajectories that are adjacent in the first direction). Improving the effective resolution of velocity control may allow improved control of coating thickness deposition as a function of location on the surface of the component. In this way, the coating system may improve the accuracy of coating application to particular portions of the surface of the component, e.g., the effective resolution of coating application may be increased.

Additionally, a coating may accumulate at different rates on different portions of a surface of the component due to, for example, fixture effects, such as aerodynamics of the different portions of the surface of the component or heat loss at the different portions of the surface of the component, or spray booth effects, such as arrangement of a component within a coating system. A sticking factor may define the rate of accumulation of a coating at a particular location on a component as a percentage of an expected rate of accumulation when neglecting these effects. Adaptive control of a coating process may enable adjustment of coating process parameters to account for sticking factor variability over a component, between components, between coating systems, or combinations thereof. Accounting for sticking factor variability may improve consistency of coating applications between components coated in a single coating process run, between components in multiple coating process runs on the same coating system, and between components coating in different coating systems.

In some examples, during the repeated application of a coating to a plurality of components, a coating system may experience process drift. Process drift may be defined as a change over time in the amount of coating accumulation on the surface of a component for a given set of coating process parameters. Process drift may be a result of, for example, wear of the components of the coating system or variability in properties of a coating material. Adaptive control of a coating process may enable incremental adjustment of coating process parameters over time to at least partially correct for process drift. In some examples, reducing process drift may extend a useful life of the components of the coating system as the components wear, reduce the need to recalibrate equipment, or both. Increasing the useful life of the components or reducing equipment recalibration may reduce equipment down time, manufacturing expenses, or the like. In some examples, reducing process drift may account for variability in coating material properties between different coating material lots, such as, for example, coating material particle size, moisture, melting point, or the like. Accounting for variability in coating material properties between different lots may reduce equipment downtime, manufacturing expense, or the like.

FIG. 1 is a conceptual and schematic block diagram illustrating an example system 10 for adaptive control of a thickness of a coating applied on a component 12. Component 12 may include a superalloy substrate, a ceramic substrate, a CMC substrate, or the like. In some examples, component 12 may be a component of a high-temperature mechanical system, such as, for example, a gas turbine engine. Component 12 may include surface imperfection such as, for example, depressions, peaks, or crests relative to a desired plane of the surface of component 12. For example, surface imperfections may be created during manufacture of component 12 or due to wear of a surface of component 12 during operation of component 12.

System 10 may include an enclosure 14 defining a coating station. System 10 also may include stage 16, mount 18, measuring device 20, and coating device 22, which may be disposed within enclosure 14. Enclosure 14 may be any suitable size or shape to at least partially enclose component 12, stage 16, mount 18, measuring device 20, and coating device 22. In some examples, enclosure 14 may be sized or shaped to allow an operator to insert or remove any one or more of component 12, stage 16, mount 18, measuring device 20, and coating device 22 to and from enclosure 14. In some examples, enclosure 14 may be configured to maintain selected environment, e.g., a pressure or a gas composition different than atmospheric pressure or composition, around component 12. In some examples, enclosure 14 may include two or more enclosures. For example, a first enclosure may at least partially enclose at least measuring device 20, and a second enclosure may at least partially enclose at least coating device 22. System 10 also may include computing device 30, which may control operation of system 10, including, for example, at least one of stage 16, measuring device 20, or coating device 22.

Mount 18 may be configured to receive and detachably secure component 12, e.g., relative to measuring device 20 and coating device 22. For example, mount 18 may be shaped to receive a root section (e.g., fir tree section) of a turbine blade. Mount 18 may further include a clamp (e.g., spring clamp, bolt clamp, vise, or the like) or another fastener configured to detachably secure component 12 on stage 16.

Measuring device 20 may be configured to measure a three-dimensional surface geometry of component 12. For example, measuring device 20 may include a coordinate measuring machine ("CMM") (e.g., the CMM probe may be mechanical, optical, laser, or the like), a structured-light three-dimensional scanner, another non-contacting optical measurement device; digital image correlation, photogrammetry, or the like. In some examples, measuring device 20 may measure a variation in the surface of component 12 with a precision that is less than about 50 microns, less than about 25 microns, or less than about 10 microns. In other examples, measuring device 20 may measure a variation in the surface of component 12 with a precision that is less than a predetermined threshold value (e.g., a tolerance of a geometry of component 12).

Measuring device 20 may generate a data set including a plurality of values that define the surface of component 12. For example, the data set may include a plurality of tuples, such as a plurality of 3-tuples, where each tuple defines a point on the surface of component. Measuring device 20 may generate the data set with any selected format readable by computing device 30.

In some examples, measuring device 20 additionally may be configured to measure a thickness of a coating on component 12 (e.g., a test component). Measuring device 20 may measure a thickness of a coating on component 12 by any suitable destructive or non-destructive coating measurement method. In some examples, measuring device 20 may include any suitable coating thickness gauge, such as, ultrasonic gauges, eddy current gauges, PCT-CT coating thickness gauge, available form PCE Americas, Jupiter, Fla., destructive sectioning, or the like.

Coating device 22 may be configured to direct a coating material to a surface of component 12 to form a coating on the surface. Coating device 22 may include any suitable coating device, such as, for example, a thermal spray gun (e.g., a plasma spray gun, a detonation spray gun, a wire arc spray gun, a flame spray gun, a high velocity oxy-fuel (HVOF) spray gun, high velocity air fuel spray gun, a warm spray gun, a cold spray gun, or the like), a powder coating gun, a paint gun, or the like. In some examples, coating device 22 may direct a coating material to a surface of component 12 in a coating plume to deposit a layer of a coating, and may be controlled by computing device 30 to deposit multiple layers of the coating at a location of the surface over multiple passes of the coating device 22 over the location. In some examples, a layer of the coating may have a thickness that is less than a variation in the surface of component 12. For example, the predetermined variation may be a difference between the actual surface geometry of component 12 and a target surface geometry for component 12. In other examples, a layer of a coating may have a thickness that is less than a predetermined threshold value, such as a tolerance of a geometry of component 12, so that the coating may be used to compensate for deviations of the geometry of component 12 from the target geometry and arrive within the geometric tolerance for component 12. In some examples, a layer of a coating may have a thickness that varies due to thermodynamic effects associated with component 12, such as, for example, heat emitted from a surface of component 12 or components of system 10 during a particular coating run, aerodynamic effects, such as, for example, alterations in the flow of a coating material or a carrier gas due to an arrangement of components of system 10 for a particular coating run, or other spray booth effects, such as, for example, a particular arrangement of components of system 10. In some examples, a layer of a coating may have a thickness between about 0.1 mil (2.54 microns) to about 500 mil (12.7 millimeters), or about 0.5 mil (12.7 microns) to about 250 mil (6.35 millimeters), or about 0.8 mil (20.32 microns) to about 50 mil (1.27 millimeters).

Computing device 30 may include, for example, a desktop computer, a laptop computer, a tablet computer, a workstation, a server, a mainframe, a cloud computing system, a robot controller, or the like. Computing device 30 is configured to control operation of system 10 including, for example, at least one of stage 16, mount 18, measuring device 20, or coating device 22. Computing device 30 may be communicatively coupled to at least one of stage 16, mount 18, measuring device 20, or coating device 22 using respective communication connections. In some examples, the communication connection may include a network link, such as Ethernet or other network connections. Such connection may be a wireless connection, a wired connection, or a combination of both. In some examples, the communications connections may include other types of device connections, such as, USB, IEEE 1394, or the like. For example, computing device 30 may be communicatively coupled to measuring device 20 via wired or wireless measuring device connection 26 and/or coating device 22 via wired or wireless coating device connection 28.

Although not shown in FIG. 1, system 10 may include one or more power sources. In some examples, one or more power source may be electrically coupled to each of computing device 30, measuring device 20, and coating device 22. In other examples, one or more power sources may be electrically coupled to computing device 30, which may be electrically coupled to each of measuring device 20 and coating device 22 via measuring device connection 26 and coating device connection 28, respectively.

Computing device 30 may be configured to control an operation of any one or more of stage 16, mount 18, measuring device 20, or coating device 22 to position component 12 relative to measuring device 20, coating device 22, or both. For example, computing device 30 may control any one or more of stage 16, mount 18, or measuring device 20 to translate and/or rotate along at least one axis to position component 12 relative to measuring device 20. Positioning component 12 relative to measuring device 20 may include positioning at least a portion of component 12 to be measured using measuring device 20 relative to measuring device 20. Similarly, computing device 30 may control any one or more of stage 16, mount 18, or measuring device 20 to translate and/or rotate along at least one axis to position component 12 relative to coating device 22. Positioning component 12 relative to coating device 22 may include positioning at least a portion of component 12 to be coated using coating device 22 relative to coating device 22.

Computing device 30 also may be configured to control an operation of coating device 22. In some examples, computing device 30 may control a coating material source to provide a coating material to coating device 22. The coating material may include, for example, a powder, such as a fluidized powder, e.g., a powder carried in a gas or liquid. In some examples, computing device 30 may control coating device 22 to accelerate particles, e.g., of the coating material, or a gas or liquid media, toward a surface of component 12. In some examples, computing device 30 may control coating device 22 to supply energy from an energy source to the coating material or the gas or liquid media. For example, computing device 30 may control coating device 22 to generate a plasma using a working gas and a voltage source or to generate a combustion reaction using a fuel and an oxidant. In some examples, computing device 30 may control coating device 22 to mix particles a coating or feedstock with a heated gas or liquid media, such as a plasma plume, a combustion gas, or the like. Computing device 30 may control coating device 22 to direct the coating material toward a surface of component 12, by controlling a position, orientation, and movement of coating device 22 relative to component 12. Computing device 30 may control a position, orientation, and movement of coating device 22 to direct the coating material toward one or more locations on the surface of component 12.

In accordance with techniques of this disclosure, computing device 30 may be configured to control measuring device 20 to acquire a representation of the three-dimensional surface geometry (e.g., geometry) of component 12. For example, computing device 30 may control measuring device 20 to measure a geometry of component 12. The geometry of component 12 may include three-dimensional coordinates for a plurality of locations on component 12. In some examples, computing device 30 may control a mechanical or optical probe of measuring device 20 to scan or raster a surface of component 12 to acquire the geometry of component 12. In other examples, computing device 30 may control a plurality of optical elements of measuring device 20 to acquire a plurality of images of component 12. The plurality of images may be analyzed by computing device 30 or measuring device 20 to reconstruct the geometry of component 12.

In some examples, computing device 30 may be configured to control measuring device 20 to measure a thickness of a coating on component 12 in a coated state (e.g., a test component) associated with one or more of the three-dimensional coordinates for a plurality of locations on component 12. For example, computing device 30 may control a magnetic, inductive, resistive, thermal, or optical probe of measuring device 20 to scan or raster a surface of component 12 to acquire the thickness of a coating on a surface of component 12. Computing device 30 may use a previously or simultaneously acquired representation of the three-dimensional surface geometry to associate the measured thickness with the plurality of locations on component 12. For example, computing device 30 may determine a difference between a measured three-dimensional surface geometry of component 12 in an uncoated state and a measured dimensional surface geometry of component 12 in a coated state to determine the coating thickness. In some examples, the three-dimensional surface geometry of component 12 may include a nominal CAD model of the surface of component 12. Computing device 30 may be configured to retrieve the nominal CAD model from a memory storage device configured to store the nominal CAD model. As discussed above, computing device 30 may be communicatively coupled to measuring device 20. In this way, computing device 30 may receive a geometry of component 12 from measuring device 20 and/or receive a coating thickness of component 12 (e.g., a test component) from measuring device 20. Further, as described above, the geometry of component 12 and/or coating thickness of component 12 may include a data set in any selected format, such as a plurality of tuples, representing the geometry of component 12 and/or coating thickness of component 12.

In some examples, computing device 30 may be configured to control measuring device 20 to acquire respective geometries of each component of a plurality of components. For example, computing device 30 may control measuring device 20 to acquire a respective geometry of a plurality of geometries of a single component in a respective state of a plurality of states. Each state may be a different stage of a manufacturing process by which component 12 is formed. For example, a first state may be after casting, forging, additive manufacturing, or the like to form an uncoated substrate of component 12 and a second stage may be after forming a coating on a selected area of the substrate or all of the substrate. Other states are possible, depending on the manufacturing process used to form component 12. Also, computing device 30 may control measuring device 20 to acquire a respective geometry of a plurality of geometries of a respective component 12 of each component a plurality of components in a first state (e.g., an uncoated state, or a coated state, or both). The plurality of components may be components with the same or substantially similar geometry, or dissimilar geometry.

For example, computing device 30 may receive, from measuring device 20, data representative of a geometry of component 12. The geometry of component 12 may include three-dimensional coordinates of a plurality of locations on component 12. In some examples, the geometry may include a respective geometry of component 12 in a respective state of a plurality of states. For example, the geometry may include a first geometry of component 12 that may be in a first uncoated state. In other examples, the geometry may include a second geometry of component 12 in a second coated state. For example, computing device 30 may use a first geometry of component 12 in a first uncoated state and a second geometry of component 12 in a second coated state to determine a coating thickness of component 12. In other examples, the geometry may include a respective geometry of component 12 in a respective state of a plurality of states (e.g., as discussed above). In some examples, computing device 30 may receive, from measuring device 20, data representative of a respective geometry of a plurality of geometries of a respective component 12 of a plurality of components each in a respective state of a plurality of states.

Once computing device 30 receives the data representative of the geometry of component 12, in some examples, computing device 30 may determine a target coating thickness of a coating for each respective location of the plurality of locations of component 12 based on a target coated component geometry and a measured geometry of component 12. In some examples, the target coated component geometry may be a geometry of component 12 after completion of manufacturing (e.g., a final state of component 12). In other examples, the target coated component geometry may be a geometry of component 12 after an intermediate manufacturing state.

For example, computing device 30 may determine, for each respective location of the plurality of locations (which represent points on the surface(s) of component 12 (e.g., a respective x-, y-, z-axis coordinate in a three-coordinate system)), a difference between a measured geometry and a target geometry. Although describe as using the measured geometry, in some examples, the difference may be determined between a nominal CAD geometry of component 12. Computing device 30 may use any suitable coordinate system to determine the target thickness (e.g., Cartesian coordinates, polar coordinates, cylindrical coordinates, spherical coordinates, or the like). In some examples, the difference may be the target thickness of a coating. In other examples, a portion of the difference may be the target thickness of a coating. For example, a first portion of the difference may be the target thickness of a first coating and a second portion of the difference may be the target thickness of a second coating, or the like.

In some examples, to facilitate determining the difference between the measured geometry and the target geometry for each location, computing device 30 may register the measured geometry to the target geometry. For example, component 12 may include a geometrical registration feature that computing device 30 uses to register the measured geometry of component 12 to the target geometry. The registration feature may be a dedicated registration feature (e.g., a feature that serves no useful purpose aside from registration) or an incidental registration feature (e.g., a functional feature of component 12 that can also be used as a registration feature). The registration feature may include, for example, a predetermined size, shape, orientation, or the like, to allow computing device 30 to accurately register the measured geometry to the target geometry.

Computing device 30 may be configured to determine the respective difference for each respective location of the plurality of locations in a direction substantially normal to the measured surface of component 12 at the respective location. By determining the respective differences in a direction substantially normal to the measured surface of component 12, computing device 30 may facilitate application of the coating to achieve the target geometry, as the coating device 22 may be oriented to result in the coating being applied in a direction substantially normal to the surface of component 12.

After determining the plurality of respective differences, computing device 30 may determine a number of passes that coating device 22 will travel over each position of a plurality of positions to deposit the target thickness of the coating at each position of the plurality of positions, a velocity that coating device 22 will travel over each position of the plurality of positions to deposit the target thickness of the coating at each location of component 12, or both. The plurality of positions may be associated with the plurality of locations. For example, the plurality of positions may be defined by a predetermined template coating program. The plurality of positions defined by the predetermined template coating program may correlate with one or more respective locations of the plurality of locations. In some examples, a respective position of the plurality of positions may be included in an area on a surface of the component that includes one or more of the determined plurality of locations. In some examples, the plurality of positions may include respective positions that are not located on the surface of the component. For example, the plurality of positions may include at least one simulated position near an edge of component 12 but not on the surface of component 12. The at least one simulated position may enable computing device 30 to control the movement, e.g., trajectory or velocity, of the coating device 22 near the edge of component 12. In some examples, each of the plurality of positions may directly correlate to a respective location of the plurality of locations. In some examples, computing device 30 may determine at least one coating device path, which defines the motion of coating device 22 relative to component 12 for coating at least a portion of component 12. The coating program for coating component 12 may include at least one coating device path, such as a plurality of coating device paths. A first respective path of the plurality of paths may direct coating device 22 to the same portion, different portions, or one or more overlapping portions of component 12, compared to other respective paths of the plurality of paths.

In some examples, computing device 30 may determine the number of passes for each position of the plurality of positions based on a predetermined template coating program. The predetermined template program may define the plurality of positions; parameters for a coating process, including, for example, orientation and position of coating device 22 relative to component 12 for each location of component 12, movements of coating device 22 relative to component 12, and acceleration of coating device 22 relative to component 12; spray parameters including, for example, a feed rate of coating material to coating device 22, a feed rate of a working gas to coating device 22, and the like; and other parameters that define the coating process. In some examples, the predetermined template program has been experimentally verified to produce a coating with acceptable characteristics (e.g., chemical properties, mechanical properties, or both). In some examples, each of these parameters may be fixed, and only the number of passes, and a velocity of coating device 22 relative to component 12 may be changed by computing device 20. By limiting changes to the predetermined template program to only the number of passes and the velocity of coating device 22, the resulting modified coating program may be more likely to produce an acceptable coating, e.g., than if other variables, such as material feed rate, distance from coating device 22 to component 12, or the like, were to be varied.

In some examples, the predetermined template program may include a plurality of subroutines. Each respective subroutine of the plurality of subroutines may define, relative to a respective position of the plurality of positions, at least one of a path of travel of coating device 22, a velocity of travel of coating device 22, an orientation of coating device 22, or the like. Further, each subroutine may include a plurality of moves of coating device 22 relative to component 12. For example, if component 12 includes a gas turbine engine blade, the predetermined template program may include a first subroutine for coating a tip of component 12, a second subroutine for coating a high-pressure face of component 12, a third subroutine for coating a low-pressure face of component 12, a fourth subroutine for coating a platform of component 12, and a fifth subroutine for coating a root of component 12. Other examples of components 12, and numbers and corresponding position for subroutines are also contemplated. The predetermined template program may include a respective number of passes for each subroutine, e.g., a respective number of times each respective subroutine may be executed by computing device 30.

The predetermined template program may be written in any suitable programming language (e.g., C/C++, Python, Java, C#/.NET, MATLAB, Assembly, Hardware Description Languages (HDLs), LISP, industrial robot languages, BASIC/Pascal, or the like). In some examples, computing device 30 may include a pre-processor that converts the predetermined template program language (e.g., robot code) to a robot-agonistic format.

Computing device 30 may be configured to adjust one or more parameters of the predetermined template program or parameters of a coating process to arrive at a coating program for applying a coating that substantially achieve the target geometry for component 12. For example, computing device 30 may determine a respective number of passes of coating device 22 for each location of component 12. In some examples, computing device 30 may determine a number of passes for each position of the plurality of positions by determining a respective number of times each respective subroutine of a predetermined template program is to be executed or performed (e.g., a subroutine count).

In some examples, computing device 30 may determine a velocity of coating device 22 relative to component 12 for each respective position of a plurality of positions. For example, in instances in which the coating program includes a plurality of subroutines and each subroutine includes at least one move of coating device 22, computing device 30 may determine a respective velocity for each respective move of coating device 22. In this way, in some examples, coating device 30 may determine a number of passes of coating device 22 with respect to each position of the plurality of positions, a velocity of coating device 22 with respect to each position of the plurality of positions, or both, in order to determine a coating program for applying a coating to substantially achieve the target geometry of component 12.

In some examples, computing device 30 may utilize a non-linear optimization technique to determine the number of passes, the velocity, or both. For example, computing device 30 may be configured to perform an optimization using the L-BFGS-B nonlinear optimization algorithm (a limited-memory Broyden-Fletcher-Goldfarb-Shanno approximation that handles bound constraints on variables). As part of the optimization technique, computing device 30 may execute a simulation of the coating process based on the measured geometry of component 12 and at least one spray law. A spray law outputs a prediction of a rate of coating accumulation at a location based on process conditions. The process conditions may include, for example, the position and orientation of coating device 22 relative to the location (e.g., in x-, y-, and z-coordinate system), the measured geometry of component 12 including, but not limited to, surface characteristics of component 12, such as curvature, and coating material already present at the location. The spray law may be empirically based. In some examples, each spray law may include at least one spray law parameter (e.g., may include a plurality of spray law parameters). In some examples, the spray law parameters may be associated with physical processes of the coating process. In other examples, the spray law parameters may be coefficients, exponents, or the like of one or more equations representing the coating process.

In some examples, a single coating process or a single subroutine of a coating process may be represented by a plurality of spray laws. For example, each position of the plurality of positions may be associated with a respective spray law, which may be the same for all positions, may be different for at least some positions than at least some other positions, or may be different for each position. In example in which a coating includes a plurality of coating layers, each position of the plurality of position of a plurality of a respective coating layer of the plurality of coating layers may be associated with a respective spray law, which may be the same for all positions, may be different for at least some positions than at least some other positions, or may be different for each position.

In some examples, a spray law may account for an amount of coating material present at a location. For example, coating material may accumulate at a location at a rate that depends in part on an amount of coating material present at the location. In some examples, as more coating material is present at a location, further coating material may accumulate at the location more quickly. In other examples, as more coating material is present at a location, further coating material may accumulate at the location more slowly. In either case, a spray law may include a variable representing a change in the rate of accumulation of a coating on component 12 as a function of coating material present at the location. The variable may be, for example, a multiplicative factor that is applied to the spray law based on the amount of coating material present at the location (e.g., the thickness of the coating material present at the location). As such, for a given location, computing device 30 may select a different spray law to represent accumulation of coating material at the given location for each pass of a plurality of passes. Because of this, the number of passes for a position, the velocity on a second or subsequent pass over the position, or both, may be based on an amount of coating applied at a location in one or more previous passes.

Computing device 30 may utilize at least one spray law (e.g., a plurality of spray laws) and the measured geometry of component 12 to determine a number of passes of coating device 22 for each respective position of the plurality of positions to achieve the target geometry by simulating the coating process using the at least one spray law. The result of the simulation may be a number of passes of coating device 22 for each respective position of the plurality of positions. In some examples, as described above, the velocity of coating device 22 is also a controllable variable, and computing device 30 may additionally determine a respective velocity relative to component 12 for each respective position of the plurality of positions.

In some examples, such as where the predetermined template coating program is divided into a number of subroutines, each subroutine including at least one movement of coating device 22, computing device 30 may determine the number of passes for each respective position of the plurality of positions by determining a number of executions of each subroutine. Similarly, in some examples, computing device 30 may determine the respective velocity relative to component 12 by determining a respective velocity for each movement of coating device 22.

In some examples, a plurality of sets of numbers of passes and velocities may approximately achieve the target geometry of component 12. To determine which of a plurality of possible sets of numbers of passes and velocities should be selected, computing device 30 may use an optimization program, such as the L-BFGS-B optimization program described above. For example, computing device 30 may determine the component geometry created by the predetermined template coating program, the number of passes for each position of the plurality of positions, and the velocity for each position of the plurality of positions, i.e., the simulated geometry. Computing device 30 may then determine an error value of this component geometry compared to the target geometry. For example, computing device 30 may determine an average error value of the component geometry. In some examples, computing device may determine the average error value by squaring the error for each respective location, summing or averaging the squares of the error, and taking the square root of the sum.

Computing device 30 also may determine a total time for the coating process to be completed, and an acceleration experienced by coating device 22 during the coating process (e.g., acceleration due to starting and stopping motion for each movement of coating device 22). Computing device 30 may utilize at least one of the error value, the time, or the acceleration as inputs to the L-BFGS-B algorithm or another optimization algorithm, e.g., along with various parameters of the predetermined coating template program. The L-BFGS-B algorithm or other optimization algorithm may seek to reduce or minimize the objective function that is based on at least one of the error value, the time, or the acceleration. The L-BFGS-B algorithm may output new variables (e.g., number of passes for each location and velocity for each location), which may be inputs to the simulation. Computing device 30 may repeat this simulation and optimization until the objective function, and optionally, the Jacobian of the objective function is reduced below a threshold value, or a rate of change of the objective function and, optionally, the Jacobian of the objective function, is reduced to below a threshold value.

In some examples, during the determination of the number of passes and the velocity, for each position of the plurality of positions, one or more parameters of the predetermined template program may be constrained by bounds. For example, the respective velocity of coating device 22 may be constrained by a lower limit on the velocity and an upper limit on the velocity. The arrangement and relative spacing of the position of the plurality of positions may be constrained by a lower limit on the spacing of adjacent positions (e.g., an upper limit on position resolution) and an upper limit on the spacing of adjacent positions (e.g., a lower limit on position resolution). Bounds on one or more parameters of the predetermined template program may enable control of the adjusted program, e.g., the degree to which one or more parameters of the predetermined template program may be adjusted. Control of the adjusted program may enable an adjusted program to meet predetermined tolerance values.

In some examples, computing device 30 may perform a multi-step optimization routine to determine the number of passes and velocities. For example, computing device 30 may first determine a first respective number of passes of coating device 22 for each respective position of the plurality of positions. For example, in a first optimization, computing device 30 may allow the respective number of passes for each position of the plurality of positions to vary as a real number. In some examples, during the first optimization, computing device 30 also allows the velocity for each position of the plurality of positions to vary (e.g., within predetermined bounds). For example, computing device 30 may simulate a total coating accumulation as coating accumulation from a number of passes given by the integer portion of the number of passes plus coating accumulation from a single pass multiplied by the non-integer portion of the number of passes. After the first optimization converges, computing device 30 may round each respective number of passes to the nearest integer, e.g., may round each respective number of passes to the nearest greater integer. In this way, the respective number of passes for each location may be based on a respective velocity utilized during the first optimization.

In a second optimization, computing device 30 may use the rounded value of each respective number of passes to determine a respective velocity of coating device 22 for each respective position of the plurality of positions. In this way, the respective velocity of coating device 22 for each respective position of the plurality of positions may be based on the respective number of passes for each position of the plurality of positions.

Once computing device 30 has determined the respective number of passes for each position of the plurality of positions and the respective velocity for each position of the plurality of positions (e.g., the respective number of executions of each subroutine and the respective velocity for each movement of coating device 22), computing device 30 may control coating device 22 to coat component 12 based on the predetermined template coating program. For example, computing device 30 may control coating device 22 to direct a coating material to a surface of component 12 based on the determined numbers of passes and velocities. In this way, computing device 30 may be configured to coat the surface (s) of component 12 to substantially achieve a target thickness for each respective location of the plurality of locations on component 12.

The systems and techniques described herein also may be used to modify parameters of at least one spray law to account for changes in a coating process over time. For example, over a plurality of coating processes, a nozzle of coating device 22 may wear, which may cause the coating deposited with a set of coating parameters to change. To modify the parameters of at least one spray law, computing device 30 may determine a difference or set of differences between a first simulated geometry and a second, measured geometry of component 12 in a coated state. For example, computing device 30 may determine a respective difference for each respective location of the plurality of locations of the measured geometry of component 12. The first simulated geometry may be based on a first, measured geometry of component 12 in an uncoated state and a first spray law or a first plurality of spray laws. For example, computing device 30 may simulate coating accumulation on component 12 (e.g., to form the first simulated geometry) using the first spray law or the first plurality of spray laws and the first, measured geometry. As discussed above, the first spray law or each spray law of the first plurality of spray laws may include at least one respective first spray law parameter.

After simulating the coating process using the first, measured geometry and the first spray law or first plurality of spray laws, computing device may compare the first simulated geometry to the second, measured geometry (of component 12 is a coated state). Similar to the above discussion, computing device 30 may determine, for each respective location of the plurality of locations of the first, measured geometry of component 12 (e.g., a respective x-, y-, z-axis coordinate in a three-coordinate system), a respective difference between the second, measured geometry and the first simulated geometry. In this way, computing device 30 may compare a predicted or simulated thickness of a coating using the first spray law or first plurality of spray laws to an actual thickness of the coating on component 12.

In some examples, computing device 30 may determine whether the first spray law or the first plurality of spray laws represents the coating process sufficiently accurately. For example, computing device 30 may determine one or more differences representative of the difference in geometry between the first simulated geometry and the second, measured geometry of component 12. In some examples, computing device 30 may determine one value representative of the difference. For example, computing device 30 may determine a respective difference for each respective location of the second, measured geometry of component 12. Computing device then may manipulate those respective differences to arrive at a single value, e.g., by averaging the differences or squared differences, summing the differences or squared differences, or the like. The single value thus may be representative of the accuracy with which the first simulated geometry reflects the second, measured geometry of component 12. Computing device 30 may compare the single value to a predetermined threshold value to determine whether the accuracy with which the first simulated geometry reflects the second, measured geometry of component 12 is sufficient for determining coating programs for coating a component. For example, in response to the single value being less than the predetermined threshold value, computing device 30 may determine that the first spray law or first plurality of spray laws represents the coating process sufficiently accurately and may continue to use the first spray law or the first plurality of spray laws for subsequent coating processes. On the other hand, in response to the single value being greater than the predetermined threshold value, computing device 30 may determine that the first spray law or first plurality of spray laws does not represent the coating process sufficiently accurately and may proceed to adapt the first spray law or first plurality of spray laws.

In some examples, rather than determining a single value representative of the difference between the first simulated geometry and the second, measured geometry, computing device 30 may compare each respective difference associated with a location of the second, measured geometry of component 12 to a threshold difference value. Computing device 30 then may count a number of differences that exceed the threshold difference value, and compare this count to a threshold count number. In response to the count being less than the threshold count value, computing device 30 may determine that the first spray law or first plurality of spray laws represents the coating process sufficiently accurately and may continue to use the first spray law or the first plurality of spray laws for subsequent coating processes. On the other hand, in response to the count being greater than the threshold count value, computing device 30 may determine that the first spray law or first plurality of spray laws does not represent the coating process sufficiently accurately and may proceed to adapt the first spray law or first plurality of spray laws.

To adjust the first spray law or the first plurality of spray laws to more accurately represent the coating process, computing device 30 may adjust at least one first spray law parameter of the first spray law or the first plurality of first spray law parameters to determine a second spray law or a second plurality of spray law parameters. Computing device 30 then may determine a second simulated geometry based on the first, measured geometry and the second spray law or second plurality of spray laws. For example, similar to the discussion above with respect to the first simulated geometry, computing device 30 may simulate the second target geometry as the coating accumulation on component 12 using the second spray law or the second plurality of spray laws and the first geometry. Computing device 30 then may determine whether the second spray law or second plurality of spray laws represents the coating process with sufficient accuracy similar to process described above with respect to the first simulated geometry.

In some examples, computing device 30 may utilize an optimization algorithm to adjust the at least one first spray law parameter. For example, computing device 30 may utilize a nonlinear optimization algorithm, such as the L-BFGS-B nonlinear optimization algorithm, to reduce (e.g., minimize) an objective function whose inputs include one or more representations of the difference between the simulated geometry and the second, measured geometry. Similar to the process described above with respect to determining the number of passes and velocity, the L-BFGS-B algorithm may output new variables (e.g., one or more subsequent spray law parameters), which may be inputs to the simulation. For example, the L-BFGS-B algorithm inputs may include the objective function based on at least one first spray law parameter. The L-BFGS-B algorithm may adjust the at least one spray law parameter to reduce the objective function. Computing device 30 then may utilize the subsequent spray law and the first, measured geometry to determine a subsequent simulated geometry, and determine one or more values representative of differences between the second, measured geometry and the subsequent simulated geometry. The one or more values representative of differences between the second, measured geometry and the subsequent simulated geometry are then inputs to the L-BFGS-B nonlinear optimization algorithm, by which computing device 30 determines a value of an objective function, optionally, a value of a Jacobian of the objective function, and updated spray law parameters. Computing device 30 may repeat this simulation and optimization until the objective function, and optionally, the Jacobian of the objective function is reduced below a threshold value, or a rate of change of the objective function and, optionally, the Jacobian of the objective function, is reduced to below a threshold value. In this way, the L-BFGS-B nonlinear optimization algorithm may be used to minimize the difference between the simulated geometry and the second, measured geometry.

In some examples, throughout the optimization or iteration technique, coating device 30 may maintain the number of passes of coating device 22 for each respective location and the velocity of coating device 22 with respect to component 12 for each respective location constant, as these parameters are based on the actual coating process performed to coat the component 12 and achieve the second, measured geometry.

Computing device 30 may iterate this technique until a value of the objective function is less than a threshold value or a rate of change in the objective function from one iteration to the next is less than a threshold value. Once a value of the objective function is less than a threshold value or a rate of change in the objective function from one iteration to the next is less than a threshold value, computing device 30 may determine that the most recent spray law or most recent plurality of spray laws represents the coating process with sufficient accuracy. Computing device 30 then may utilize the most recent spray law or most recent plurality of spray laws in future coating processes, e.g., to determine a number of passes and velocities for further coating processes.

In some examples, computing device 30 may utilize measurements associated with a plurality of components to at least partially correct for process drift. For example, similar to the above discussion, computing device 30 may determine one or more values representative of difference between a respective subsequent simulated geometry and a respective second, measured geometry of component 12 for each respective component of a plurality of components. Computing device 30 may determine a combination, such as an average, of the plurality differences. In some examples, computing device 30 may determine a mean of the plurality of differences. In other examples, computing device 30 may determine a weighted average of the plurality of differences. For example, computing device 30 may assign a relative weight to each of the plurality of differences. In some examples, the relative weight may be based on the order in which each of the respective components of the plurality of components were coated by coating device 22. For example, a difference associated with a more recently coated component may be assigned a higher relative weight than a difference associated with a less recently coated component. In some examples, similar to the above discussion, computing device 30 may compare the average of the plurality of differences to the predetermined threshold value or utilize the average as an input to the optimization algorithm, such as the L-BFGS-B algorithm. By using differences associated with a plurality of components, computing device 30 may at least partially correct for process drift in coating device 22. In some examples, differences associated with a plurality of components, computing device 30 may more accurately at least partially correct for process drift in coating device 22, compared to using only difference associated with only one component. For example, using differences associated with a plurality of components may reduce effect of an outlier component, thus providing a more stable coating process.

In some examples, computing device 30 may repeat the at least partial correction for process drift at regular or irregular intervals. For example, computing device 30 may determine a subsequent spray law or a plurality of subsequent spray laws after controlling coating device 22 to coat about 10 components, about 100 components, about 1,000 components, or the like. Computing device 30 may then use the subsequent spray law or the plurality of subsequent spray laws to control coating device 22 to coat another about 10 components, about 100 components, about 1,000 components, or the like. In some examples, the regular or irregular intervals may occur during a sequential coating of a plurality of components. In this way, computing device 30 may adaptively control a thickness of a coating of a plurality of components.

Figure 2:
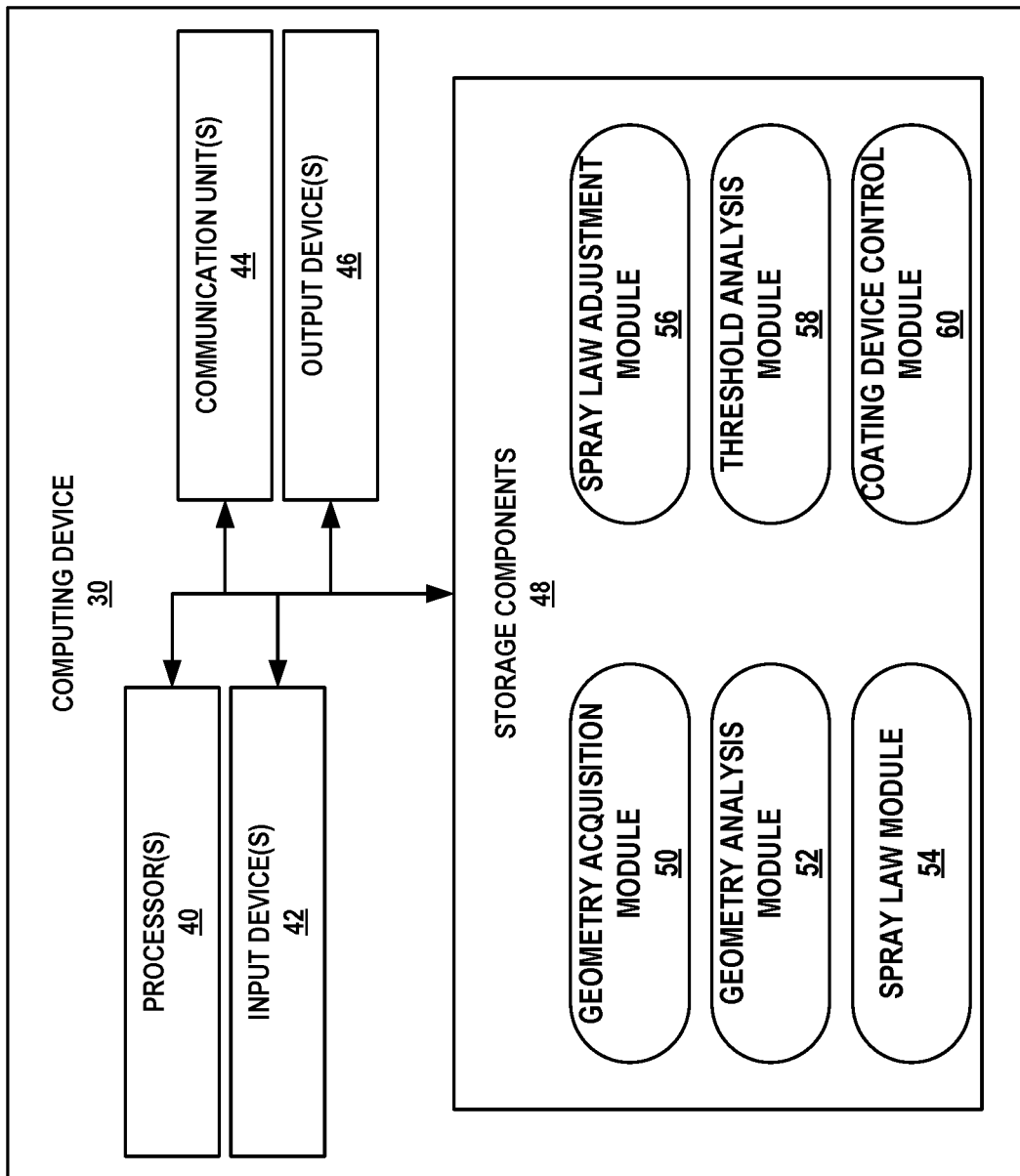
FIG. 2 is a conceptual and schematic block diagram illustrating an example of the computing device illustrated in FIG. 1.

FIG. 2 is a conceptual and schematic block diagram illustrating an example of computing device 30 illustrated in FIG. 1. In the example of FIG. 2, computing device 30 includes one or more processors 40, one or more input devices 42, one or more communication units 44, one or more output devices 46, and one or more one or more storage components 48. In some examples, one or more storage components 48 includes geometry acquisition module 50, geometry analysis module 52, spray law module 54, spray law adjustment module 56, threshold analysis module 58, and coating device control module 60. In other examples, computing device 30 may include additional components or fewer components than those illustrated in FIG. 2. In some examples, computing device 30 may include a simulation module configured to query spray law module 54 when performing simulations, a spray program adjustment module configured to update the spray laws based on an optimization algorithm, or both.

One or more processors 40 are configured to implement functionality and/or process instructions for execution within computing device 30. For example, processors 40 may be capable of processing instructions stored by one or more storage components 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

Computing device 30 also includes one or more input devices 42. Input devices 42, in some examples, are configured to receive input from a user through tactile, audio, or video sources. Examples of input devices 42 include a mouse, a keyboard, a voice responsive system, video camera, microphone, touchscreen, or any other type of device for detecting a command from a user.

Computing device 30 further includes one or more communication units 44. Computing device 30 may utilize communication units 44 to communicate with external devices (e.g., stage 16, mount 18, measuring device 20, and/or coating device 22) via one or more networks, such as one or more wired or wireless networks. Communication unit 44 may be a network interface card, such as an Ethernet card, an optical transceiver, a radio frequency transceiver, or any other type of device that can send and receive information. Other examples of such network interfaces may include WiFi'" radios or USB. In some examples, computing device 30 utilizes communication units 44 to wirelessly communicate with an external device such as a server.

Computing device 30 may further include one or more output devices 46. Output devices 46, in some examples, are configured to provide output to a user using audio or video media. For example, output devices 46 may include a display, a sound card, a video graphics adapter card, or any other type of device for converting a signal into an appropriate form understandable to humans or machines.

One or more storage components 48 may be configured to store information within computing device 30 during operation. One or more storage components 48, in some examples, include a computer-readable storage medium or computer-readable storage device. In some examples, one or more storage components 48 include a temporary memory, meaning that a primary purpose of one or more storage components 48 is not long-term storage. One or more storage components 48, in some examples, include a volatile memory, meaning that one or more storage components 48 does not maintain stored contents when power is not provided to one or more storage components 48. Examples of volatile memories include random access memories (RAM), dynamic random-access memories (DRAM), static random-access memories (SRAM), and other forms of volatile memories known in the art. In some examples, one or more storage components 48 are used to store program instructions for execution by processors 40. One or more storage components 48, in some examples, are used by software or applications running on computing device 30 to temporarily store information during program execution.

In some examples, one or more storage components 48 may further include one or more storage components 48 configured for longer-term storage of information. In some examples, one or more storage components 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 30 also may include geometry acquisition module 50, geometry analysis module 52, spray law module 54, spray law adjustment module 56, threshold analysis module 58, and coating device control module 60. Each of geometry acquisition module 50, geometry analysis module 52, spray law module 54, spray law adjustment module 56, threshold analysis module 58, and coating device control module 60 may be implemented in various ways. For example, one or more of geometry acquisition module 50, geometry analysis module 52, spray law module 54, spray law adjustment module 56, threshold analysis module 58, and coating device control module 60 may be implemented as an application or a part of an application executed by one or more processors 40. In other examples, one or more of geometry acquisition module 50, geometry analysis module 52, spray law module 54, spray law adjustment module 56, threshold analysis module 58, and coating device control module 60 may be implemented as part of a hardware unit of computing device 30 (e.g., as circuitry). Functions performed by one or more of geometry acquisition module 50, geometry analysis module 52, spray law module 54, spray law adjustment module 56, threshold analysis module 58, and coating device control module 60 are explained below with reference to the example flow diagrams illustrated in FIGS. 3 and 4.

Computing device 30 may include additional components that, for clarity, are not shown in FIG. 2. For example, computing device 30 may include a power supply to provide power to the components of computing device 30. Similarly, the components of computing device 30 shown in FIG. 2 may not be necessary in every example of computing device 30.

Figure 3:
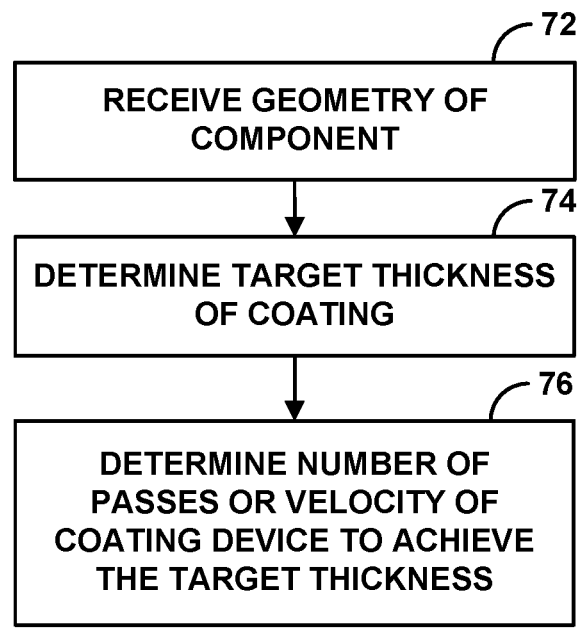
FIG. 3 is a flow diagram of an example technique for controlling a thickness of a coating applied to a component.

FIG. 3 is a flow diagram of an example technique for controlling a thickness of a coating applied to a component 12. Although the technique of FIG. 3 will be described with respect to system 10 of FIG. 1 and computing device 30 of FIG. 2, in other examples, the technique of FIG. 3 may be performed using a different system, a different computing device, or both. Additionally, system 10 and computing device 30 may perform other techniques for controlling a thickness of a coating applied to a component.

In some examples, although not shown in FIG. 3, the technique may include controlling, by computing device 30, for example, geometry acquisition module 50, a position of any one or more of stage 16, mount 18, measuring device 20, and coating device 22 to position component 12 relative to measuring device 20, coating device 22, or both. For example, computing device 30 and, more particularly, geometry acquisition module 50, may control any one or more of stage 16, mount 18, or measuring device 20 to translate and/or rotate along at least one axis to position component 12 relative to measuring device 20. Computing device 30 may store, in one or more storage components 48, an initial position of any one or more of stage 16, mount 18, measuring device 20, and coating device 22 to facilitate repeatable measuring of a geometry of component 12 in a respective state of a plurality of states (e.g., as discussed above), registration of the measured geometry of component 12 to a simulated geometry, or both. As discussed above, each respective component 12 of the plurality of components may include a superalloy component, a ceramic component, or a CMC component.

The technique illustrated in FIG. 3 includes receiving, by computing device 30, for example, geometry acquisition module 50, data representative of the three-dimensional surface geometry (e.g., geometry) of component 12 from measuring device 20 (72). For example, the geometry of component 12 may include three-dimensional coordinates of a plurality of locations on component 12 in a respective state of a plurality of states or each component of a plurality of components.

After receiving the data representative of the geometry of component 12, the technique illustrated in FIG. 3 includes determining, by computing device 30, for example, geometry analysis module 52, a respective target coating thickness of a coating for each respective location of the plurality of locations on component 12 (74). In some examples, the respective target coating thickness may be based on a target coated component geometry and a measured geometry of the component. For example, similar to the discussion above, the technique may include determining, by the computing device 30 and, more particularly, geometry analysis module 52, for each respective location of the plurality of locations (which represent points on the surface(s) of component 12 (e.g., a respective x-, y-, z-axis coordinate in a three-coordinate system)), a difference between a measured geometry and a target geometry. In some examples, determining the respective target coating thickness of the coating for each respective location of the plurality of locations on component 12 (74) may include registering, by computing device 30, for example, geometry analysis module 52, the measured geometry to the target geometry, to facilitate determining the differences between the measured geometry and the target geometry for each location. In some examples, computing device 30, for example, geometry analysis module 52, may determine the respective difference for each respective location of the plurality of locations in a direction substantially normal to the measured surface of component 12 at the respective location.

After determining the target thickness, the technique illustrated in FIG. 3 may include determining, by computing device 30, for example, spray law module 54, a number of passes that coating device 22 will travel over each position of the plurality of positions (e.g., defined by a predetermined template coating program) to deposit the target thickness of the coating at each location of component 12, a velocity that coating device 22 will travel over each position of the plurality of positions to deposit the target thickness of the coating at each location of component 12, or both (76). For example, computing device 30, for example, spray law module 54, may determine at least one coating device path, which defines the motion of coating device 22 relative to component 12 for coating at least a portion of component 12. The coating program for coating component 12 may include at least one coating device path, such as a plurality of coating device paths. A first respective path of the plurality of paths may direct a coating material to the same portion, different portions, or one or more overlapping portions of component 12, compared to other respective paths of the plurality of paths.

In some examples, determining the number of passes or velocity that coating device 22 will travel over each position of the plurality of positions to deposit the target thickness of the coating at each location of component 12 (76) may include determining, by computing device 30, for example, spray law module 54, may determine the number of passes over each position based on a predetermined template coating program. In some examples, the predetermined template program may define the plurality of positions and parameters for a coating process, which may be experimentally verified. In some examples, each of these parameters may be fixed, and only the number of passes and the velocity of coating device 22 relative to component 12 may be changed by computing device 20. In some examples, the predetermined template program may include a plurality of subroutines. In some examples, the predetermined template program may be written in any suitable programming language (e.g., C/C++, Python, Java, C#/.NET, MATLAB, Assembly, Hardware Description Languages (HDLs), LISP, industrial robot languages, BASIC/Pascal, or the like).

In some examples, computing device 30, for example, spray law adjustment module 56, may adjust one or more parameters of the predetermined template program or parameters of a coating process to arrive at a coating program for applying a coating to substantially achieve the target geometry for component 12. For example, computing device 30, for example, spray law module 54, may determine a respective number of passes of coating device 22 for each position of the plurality of positions. In some examples, computing device 30, for example, spray law module 54, may determine a number of passes for each position of the plurality of positions by determining a respective number of times each respective subroutine of a predetermined template program is to be executed or performed (e.g., a subroutine count).

In some examples, determining the number of passes or velocity that coating device 22 will travel over each position of the plurality of positions to deposit the target thickness of the coating at each location of component 12 (76) may include determining, by computing device 30, for example, spray law module 54, a velocity of coating device 22 relative to component 12 for each respective position of the plurality of positions. For example, in instances in which the coating program includes a plurality of subroutines and each subroutine includes at least one move of coating device 22, computing device 30, for example, spray law module 54, may determine a respective velocity for each respective move of coating device 22. In this way, in some examples, the technique may include determining, by computing device 30, for example, spray law module 54, a number of passes of coating device 22 with respect to each position of the plurality of positions, a velocity of coating device 22 with respect to each position of the plurality of positions, or both, in order to determine a coating program for applying a coating to substantially achieve the target geometry of component 12.

In some examples, computing device 30, for example, spray law adjustment module 56, may utilize a non-linear optimization technique to determine the number of passes, the velocities, or both. For example, computing device 30, for example, spray law adjustment module 56, may perform an optimization using the L-BFGS-B nonlinear optimization algorithm (a limited-memory Broyden-Fletcher-Goldfarb-Shanno approximation that handles bound constraints on variables). In some examples, part of the optimization may include executing, by computing device 30, for example, spray law adjustment module 56, a simulation of the coating process based on the measured geometry of component 12 and at least one spray law.

In some examples, determining the number of passes or velocity that coating device 22 will travel over each position of the plurality of positions to deposit the target thickness of the coating at each location of component 12 (76) may include utilizing, by computing device 30, for example, spray law module 54, the at least one spray law (e.g., a plurality of spray laws) and the measured geometry of component 12 to determine a number of passes of coating device 22 for each respective position of the plurality of positions to substantially achieve the target geometry by simulating the coating process using the at least one spray law, to determine a velocity of coating device 22 for each respective position of the plurality of positions to substantially achieve the target geometry by simulating the coating process using the at least one spray law, or both. In some examples, such as where the predetermined template coating program is divided into a number of subroutines, each subroutine including at least one movement of coating device 22, the technique may include determining, by computing device 30, for example, spray law module 54, the number of passes for each respective position of the plurality of positions by determining a number of executions of each subroutine. Similarly, in some examples, the technique may include determining, by computing device 30, for example, spray law module 54, the respective velocity relative to component 12 by determining a respective velocity for each movement of coating device 22.

In some examples, during the optimization process, computing device 30, for example, spray law module 54, may select a different spray law to represent accumulation of coating material at a given location for each pass of a plurality of passes. For example, a respective spray law may be associated with each respective location of the plurality of locations of the measure geometry of component 12.

After determining the respective number of passes for each position and the respective velocity for each position (e.g., the respective number of executions of each subroutine and the respective velocity for each movement of coating device 22), the technique may include controlling, by computing device 30, for example, coating device control module 54, control coating device 22 to coat component 12 based on the plurality of positions and the predetermined template coating program. For example, computing device 30 may control coating device 22 to direct a coating material to a surface of component 12 based on the determined numbers of passes and velocities. In this way, computing device 30 may be configured to coat the surface(s) of component 12 to substantially achieve a target thickness for each respective location of the plurality of locations on component 12.

Figure 4:
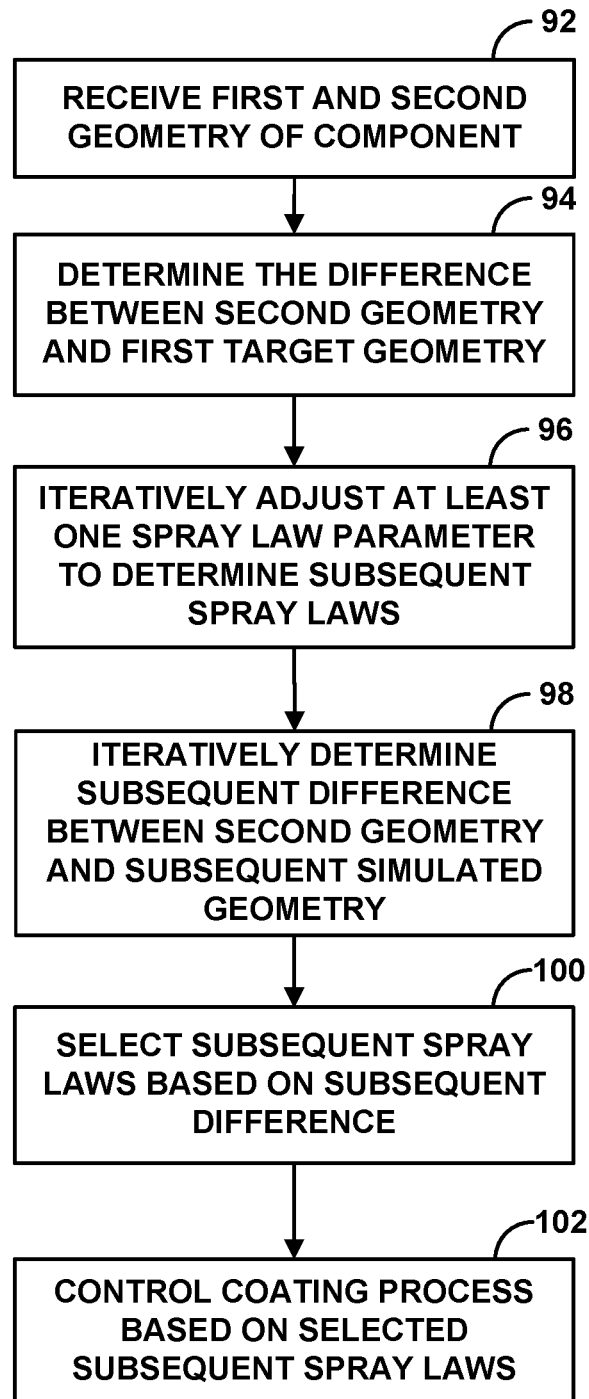
FIG. 4 is a flow diagram of an example technique for adaptively determining spray law parameters used for a spray process to achieve a thickness of a coating applied to a component.

FIG. 4 is a flow diagram of an example technique for adaptively determining spray law parameters used for a spray process to achieve a thickness of a coating applied to component 12. Although the technique of FIG. 4 will be described with respect to system 10 of FIG. 1 and computing device 30 of FIG. 2, in other examples, the technique of FIG.

4 may be performed using a different system, different computing device, or both. Additionally, system 10 and computing device 30 may perform other techniques for adaptively controlling a thickness of a coating applied to a component 12.

The technique illustrated in FIG. 4 includes receiving, by computing device 30, for example, geometry acquisition module 50, a first, measured geometry of component 12 in a first state (e.g., an uncoated state) and a second, measured geometry of component 12 in a subsequent state (e.g., a coated state) (92). Receiving the first geometry and second geometry of component 12 may be the same or substantially similar as described above with respect to FIG. 3, except that each of the first geometry and second geometry may include a respective geometry of a plurality of geometries of component 12 in a respective state of a plurality of states.

The technique illustrated in FIG. 4 includes determining, by computing device 30, for example, geometry analysis module 52, a respective first difference between a first simulated geometry and a second, measured geometry in a coated state (94). Each respective first difference may correspond to a respective location of the plurality of locations of the measured geometry of component 12. The first simulated geometry may be based on a first, measured geometry of component 12 in an uncoated state and a first spray law or a first plurality of spray laws. For example, computing device 30, for example, spray law module 54, may simulate coating accumulation on component 12 using the first spray law or the first plurality of spray laws and the first, measured geometry. As discussed above, the first spray law or each spray law of the first plurality of spray laws may include at least one respective first spray law parameter.

After simulating the coating process using the first, measured geometry and the first spray law or first plurality of spray laws, the technique may include comparing, by computing device 30 and, more particularly, geometry analysis module 52, the first simulated geometry to the second, measured geometry. For example, the technique may include determining, by computing device 30 and, more particularly, geometry analysis module 52, for each respective location of the plurality of locations of the first, measured geometry of component 12 (e.g., a respective x-, y-, z-axis coordinate in a three-coordinate system), a respective difference between the second, measured geometry and the first simulated geometry.

In some examples, although not illustrated in FIG. 4, the technique may include determining, by computing device 30, for example threshold analysis module 58, whether the first spray law or the first plurality of spray laws represents the coating process sufficiently accurately. For example, computing device 30, for example threshold analysis module 58, may utilize the one or more differences representative of the difference in geometry between the first simulated geometry and the second, measured geometry of component 12. In some examples, computing device 30, for example threshold analysis module 58, may determine one value representative of the difference. In some examples, computing device 30, for example threshold analysis module 58, may manipulate the respective differences to arrive at a single value, as described above. For example, computing device 30, for example, threshold analysis module 58, may compare the single value to a predetermined threshold value to determine whether the accuracy with which the first simulated geometry reflects the second, measured geometry of component 12 is sufficient for determining coating programs for coating another component. In other examples, computing device 30, for example threshold analysis module 58, may compare each respective difference associated with a location of the second, measured geometry of component 12 to a threshold difference value. Computing device 30, for example, threshold analysis module 58, may count a number of differences that exceed the threshold difference value, and compare this count to a threshold count number.

The technique illustrated in FIG. 4 also includes iteratively adjusting, by computing device 30, for example, spray law adjustment module 56, at least one first spray law parameter of the first spray law or the first plurality of first spray law parameters to determine a subsequent spray law or a subsequent plurality of spray law parameters (96). In some examples, the subsequent spray law or the subsequent plurality of spray law parameters may more accurately represent the coating process. After determining the second spray laws, although not illustrated in FIG. 4, the technique includes determining, by computing device 30, for example, spray law module 54, a subsequent simulated geometry based on the first, measured geometry and the subsequent spray law or subsequent plurality of spray laws.

After determining the subsequent simulated geometry, the technique may include determining, by computing device 30, for example, spray law module 54, whether the subsequent spray law or subsequent plurality of spray laws represents the coating process with sufficient accuracy, similar to the process described above with respect to the first simulated geometry. For example, the technique illustrated in FIG. 4 includes iteratively determining, by computing device 30 and, more particularly, geometry analysis module 52, a respective subsequent difference between the second geometry and a subsequent simulated geometry (98).

In some examples, the technique includes utilizing, by computing device 30 and, more particularly, spray law adjustment module 54, an optimization algorithm to adjust the at least one first spray law parameter and determine the subsequent spray law or the subsequent plurality of spray laws. As discussed above, the optimization algorithm may include, for example, a nonlinear optimization algorithm, such as the L-BFGS-B nonlinear optimization algorithm, to reduce (e.g., minimize) an objective function whose inputs include one or more representations of the difference between the simulated geometry and the second, measured geometry. In some examples, the technique may include iteratively adjusting a spray law to determine a subsequent spray law and iteratively determining a respective subsequent difference until a value of the objective function is less than a threshold value or a rate of change in the objective function from one iteration to the next is less than a threshold value.

Once a value of the objective function is less than a threshold value or a rate of change in the objective function from one iteration to the next is less than a threshold value, computing device 30, for example, threshold analysis module 58, may select a subsequent spray law from the respective subsequent spray laws based on the respective subsequent differences (100). For example, the technique may include determining, by computing device 30, for example, threshold analysis module 58, that the most recent spray law or most recent plurality of spray laws represents the coating process with sufficient accuracy.

After selecting a subsequent spray law or subsequent spray laws that represent the coating process with sufficient accuracy, the technique illustrated in FIG. 4 includes controlling, by computing device 30, for example, coating device control module 58, a coating process based on the selected subsequent spray law (102). For example, computing device 30, for example, coating device control module

58, may utilize the most recent spray law or most recent plurality of spray laws in future coating processes, e.g., to determine a number of passes and velocities for further coating processes.

In some examples, the technique of FIG. 4 may include utilizing, by computing device 30, for example, coating device control module 58, measurements associated with a plurality of components to at least partially correct for process drift. For example, similar to the above discussion in reference to FIG. 1, computing device 30, for example, geometry analysis module 52, may determine one or more values representative of a difference between a respective subsequent simulated geometry and a respective second, measured geometry of component 12 for each respective component of a plurality of components. Computing device 30, for example, geometry analysis module 52, then may determine a combination, such as an average, a mean, a weighted average, of the plurality or differences. Computing device 30, for example, geometry analysis module 52, may compare the combination of the plurality of differences to the predetermined threshold value or utilize the average as an input to the optimization algorithm, such as the L-BFGS-B algorithm. By using differences associated with a plurality of components, the technique may at least partially correct for process drift in coating device 22.

In some examples computing device 30, may repeat the technique of FIG. 4 at regular or irregular intervals. For example, by computing device 30, may repeat the technique of FIG. 4 after controlling coating device 22 to coat a particular number of components (e.g., about 10 components, about 100 components, about 1,000 components, or the like) or after controlling coating device 22 to coat components over a particular duration (e.g., a number of hours, such as, less than about one hour, about 10 hours, or the like; a number of days, such as, about one day, about one week, or the like). In this way, the technique of FIG. 4 allows computing device 30 to adaptively determine spray law parameters used for a spray process to achieve a thickness of a coating of a plurality of components.

Figure 5:
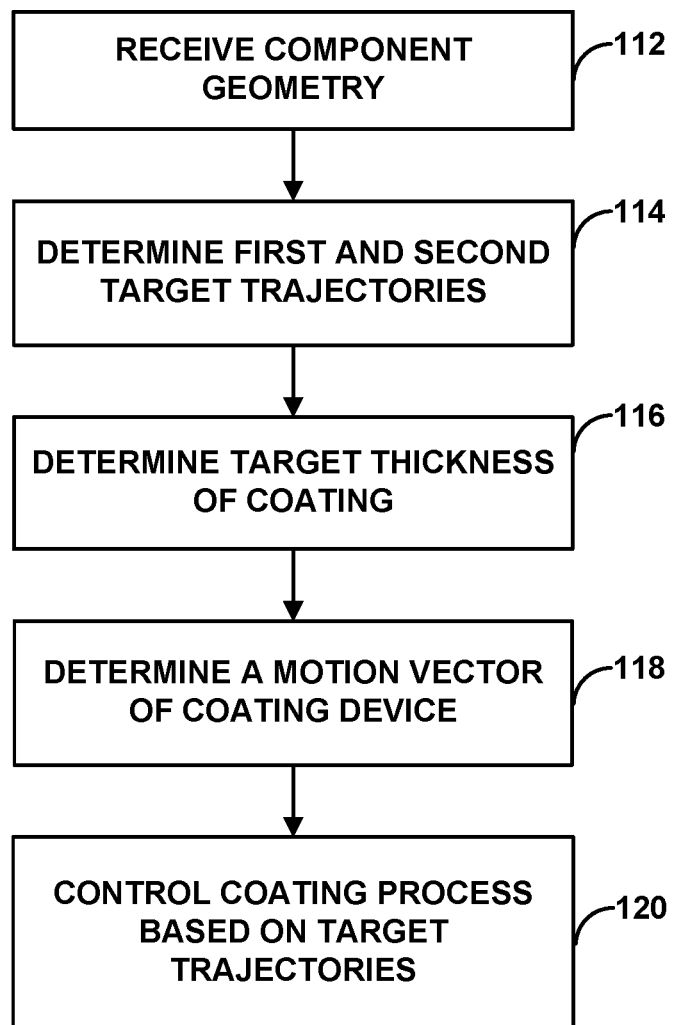
FIG. 5 is a flow diagram illustrating an example technique for controlling a thickness of a coating applied to a component using target trajectory points.

In some examples, selection of positions of a plurality of target trajectory points defining one or more target trajectories relative to a surface to be coated may be used to improve a resolution of the coating device relative to the surface of the component, including, for example, the degree of control of changes in coating device velocity relative to the surface of the component. FIG. 5 is a flow diagram illustrating an example technique for controlling a thickness of a coating applied to a component 12 using target trajectory points. Although the technique of FIG. 5 will be described with respect to system 10 of FIG. 1 and computing device 30 of FIG. 2, in other examples, the technique of FIG. 5 may be performed using a different system, a different computing device, or both. Additionally, system 10 and computing device 30 may perform other techniques for controlling a thickness of a coating applied to a component using target trajectory points.

The technique illustrated in FIG. 5 includes receiving, by computing device 30, for example, geometry acquisition module 50, a geometry of component 12 in a first state (e.g., an uncoated state) (112). As discussed above, the geometry may include a plurality of locations on a surface of component 12. Receiving the geometry of component 12 may be the same or substantially similar as described above with respect to FIG. 3.

The technique illustrated in FIG. 5 also includes determining, by computing device 30, for example, geometry acquisition module 50, a first target trajectory and a second target trajectory for coating device 22 or the plume generated by coating device 22. The first and second target trajectories may define a path of travel of coating device 22 or the plume generated by coating device 22 relative to the surface of component 12. The first target trajectory may include a first plurality of target trajectory points and the second target trajectory may include a second plurality of target trajectory points. Each of the first and second plurality of target trajectory points may be based on the plurality of locations on the surface of component 12, but may or may not correspond to the plurality of locations. For example, a location of each respective target trajectory point of the first and second plurality of target trajectory points relative to the surface of component 12 may be defined by one or more locations of the plurality of locations.

Figure 6:
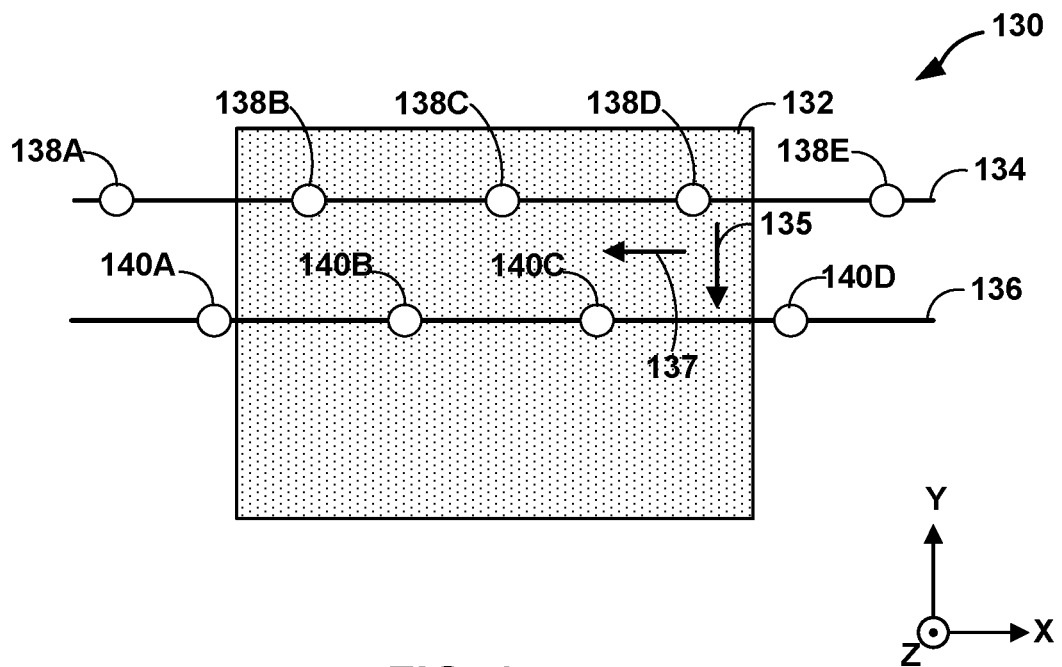
FIG. 6 is a conceptual diagram illustrating example coating device target trajectories and target trajectory points on a rectangular component.

FIG. 6 is a conceptual diagram illustrating example coating device target trajectories and target trajectory points on a rectangular component 130. As illustrated by FIG. 6, a first target trajectory 134 and a second target trajectory 136 are offset in a first direction 135 relative to each other. First target trajectory 134 and second target trajectory 136 may define a path of travel of coating device 22 or the plume generated by coating device 22 relative to a surface of component 12. In other examples, a plurality of target trajectories, such as more than two target trajectories, may define the path of travel of coating device 22. Although first target trajectory 136 and second target trajectory 138 are illustrated as substantially parallel, in other examples, one or more target trajectories of a plurality of target trajectories may be non-parallel or intersecting. For example, a first set of one or more target trajectories may define a first pass of a plurality of passes of coating device 22 and a second set of one or more target trajectories may define a second pass of the plurality of passes of coating device 22 intersecting the first set of one or more target trajectories. In this way, a plurality of target trajectories may be selected to enable coating device 22 to apply a coating material to any selected portion of a surface of component 12.

The offset between first target trajectory 134 and second target trajectory 136 in first direction 135 may be any suitable distance. In some examples, the offset between first target trajectory 134 and second target trajectory 136 in first direction 135 may be less than a diameter of the coating plume at the surface of component 12. In other examples, the offset between first target trajectory 134 and second target trajectory 136 in first direction 135 may be less than a radius of the coating plume at the surface of component 12, such that the coating plume overlaps second target trajectory 136 while coating device 22 follows first target trajectory 134, and vice versa. In some examples, the offset between first target trajectory 134 and second target trajectory 136 in first direction 135 may be significantly less than a radius of the coating plume at the surface of component 12, such that the coating plume overlaps more than one adjacent target trajectory while coating device 22 follows a given target trajectory.

A target trajectory may include any suitable number of target trajectory points. For example, first target trajectory 134 includes a plurality of first target trajectory points 138A, 138B, 138C, 138D, and 138E (collectively, "first target trajectory points 138"), and second target trajectory 136 includes a plurality of second target trajectory points 140A, 140B, 140C, and 140D (collectively, "second target trajectory points 140"). Computing device 30 may control motion of coating device 22 based on target trajectory points 138 and 140. For example, each of target trajectory points 138 and 140 may represent a center of a volume (e.g., a sphere or polygon). Each target trajectory point of target trajectory points 138 and 140 may be associated with a respective motion vector that defines the motion direction and velocity of coating device 22. Computing device 30 may control coating device 22 to move from a first target trajectory point (e.g., first target trajectory point 138A) to a second, subsequent target trajectory point (e.g., second target trajectory point 138B). In some examples, computing device 30 controls coating device 22 to move from the first target trajectory point (e.g., first target trajectory point 138A) to the second, subsequent target trajectory point (e.g., second target trajectory point 138B) upon coating device 22 entering the volume associated with the first target trajectory point. As coating device 22 has mass and the motors imparting motion to coating device 22 have finite power, acceleration of coating device 22 between one target trajectory point and a subsequent target trajectory point is limited. Thus, reducing spacing between adjacent target trajectory points in a single target trajectory (e.g., first target trajectory points 138 in first target trajectory 134) may introduce imprecision or deviation in actual velocity of coating device 22 relative to component 12 compared to the target velocity, as the spacing may not be sufficient to allow coating device 22 to accelerate to the desired velocity at each target trajectory point.

As such, a given system 10 may have a minimum value for spacing between adjacent target trajectory points in a single target trajectory. In some examples, the minimum value may be about 5 millimeters, or about 10 millimeters or about 15 millimeters.

In some examples, the position of the plurality of target trajectory points on the surface of the component may be selected to improve an effective resolution of control of the velocity of the coating device and, thus, an effective resolution of thickness control for the coating. As illustrated in FIG. 6, each first target trajectory point of first trajectory points 138 and each second target trajectory point of second target trajectory points 140 are offset in a second direction 137 relative to each other. For example, first target trajectory point 138C is offset from second target trajectory point 140C in second direction 137, rather than being aligned directly above second target trajectory point 140C. The offset arrangement of first target trajectory points 138 and second target trajectory points 140 may improve the effective resolution of control points for coating device 22 relative to the surface of component 12 by reducing the effective spacing between adjacent target trajectory points in the direction of motion of coating device 22 along a target trajectory, compared to an example, in which target trajectory points are aligned in a column. This may be particularly the case in examples in which the coating plume overlaps at least one adjacent target trajectory. Improving the effective resolution of coating device 22 may enable computing device 30 to reduce deviations in the actual velocity of coating device 22 compared to the target velocity as coating device 22 moves along a target trajectory. In this way, selecting the distribution of target trajectory points may improve velocity control of coating device 22. By improving velocity control of the coating device, the coating system may improve the accuracy of coating application to particular portions of the surface of the component, e.g., the resolution of coating application may be increased.

In some examples, target trajectory points in multiple rows may offset by fractional amounts to form a periodic arrangement of target trajectory points over multiple target trajectories. For example, in FIG. 6, every other target trajectory may include substantially aligned target trajectory points. As another example, every third target trajectory may include substantially aligned target trajectory points, such that a first target trajectory defines a spacing between adjacent target trajectory points, a second target trajectory adjacent to the first target trajectory includes target trajectory points spaced the same distance apart but offset relative to target trajectory points of the first target trajectory by ⅓ of the distance between adjacent target trajectory points in the same target trajectory, and a third target trajectory adjacent to the second target trajectory includes target trajectory points spaced the same distance apart but offset relative to target trajectory points of the second target trajectory by ⅓ of the distance between adjacent target trajectory points in the same target trajectory. Continuing this example, a fourth target trajectory may include target trajectory points spaced the same distance apart and aligned with target trajectory points of the first target trajectory (and offset relative to target trajectory points of the third target trajectory by ⅓ of the distance between adjacent target trajectory points in the same target trajectory). This may be extended to any number of fractional offsets. The number of fractional offsets may be related to the number of adjacent target trajectories that the coating plume covers while following a given target trajectory. For example, if the coating plume covers a total of 5 target trajectories (a center target trajectory that coating device 22 is following and two adjacent target trajectories on either side of the center target trajectory), every third target trajectory may include substantially aligned target trajectory points.

Figure 7:
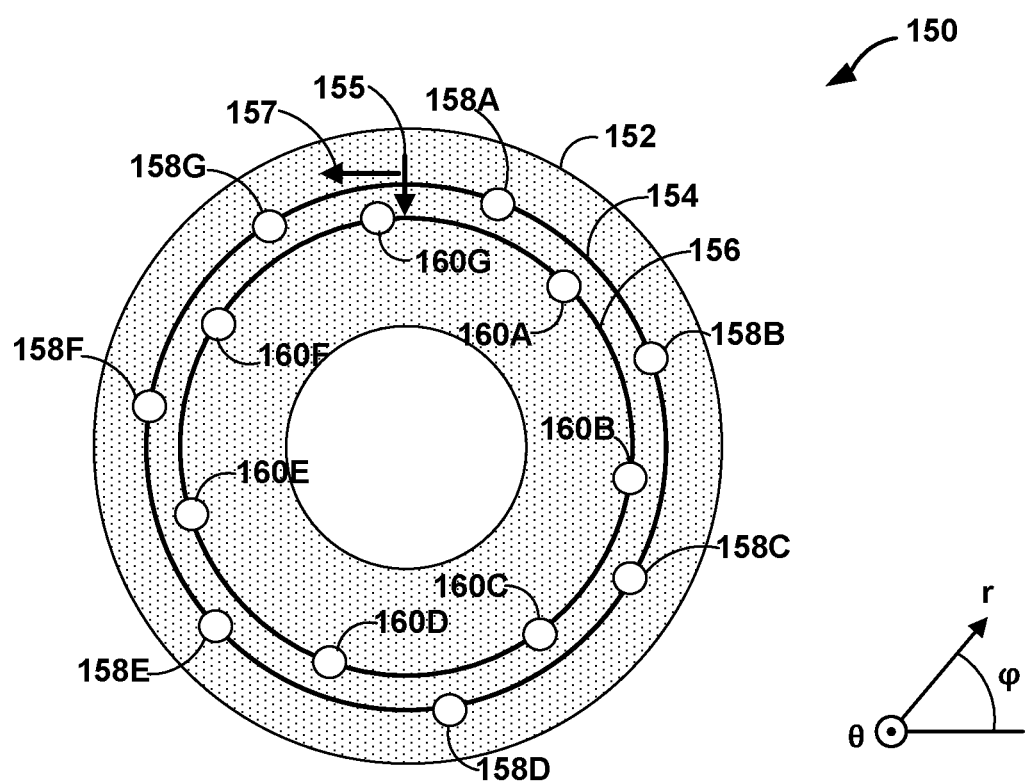
FIG. 7 is a conceptual diagram illustrating example coating device target trajectories and target trajectory points on an annular component.

Although first trajectory 136 and second trajectory 138 are illustrated as substantially parallel straight lines in a Cartesian plane, in other examples, one or more trajectories of a plurality of trajectories may include curved or serpentine lines defined by other coordinate systems, such as, for example, one or more of spherical, cylindrical, or polar coordinates. For example, FIG. 7 is a conceptual diagram illustrating example coating device target trajectories and target trajectory points on an annular component 150. As illustrated by FIG. 7, a first target trajectory 154 and a second target trajectory 156 are offset in a first direction 155 relative to each other (e.g., first target trajectory 154 and a second target trajectory 156 are concentric). First trajectory 154 includes a plurality of first trajectory points 158A, 158B, 158C, 158D, 158E, 158F, and 158G (collectively, "first trajectory points 158"), and second trajectory 156 includes a plurality of second trajectory points 160A, 160B, 160C, 160D, 160E, 160F, and 160G (collectively, "second trajectory points 160"). Each first trajectory point of first trajectory points 158 and each second target trajectory point of second target trajectory points 160 may be offset in a second direction 157 relative to each other. First target trajectory 154 including first target trajectory points 158 and second target trajectory 156 including second target trajectory points 160 may be substantially similar to first target trajectory 134 including first target trajectory points 138 and second target trajectory 136 including second target trajectory points 140, discussed above with respect to FIG. 6, except that first direction 135 includes a radial direction and second direction 137 includes an azimuthal angle (or polar angle) in spherical coordinates. In this way, any suitable coordinate system or combination of coordinate systems may be used to determine the target trajectories.

After receiving the data representative of the geometry of component 12, the technique illustrated in FIG. 5 optionally includes determining, by computing device 30, for example, geometry analysis module 52, a respective target coating thickness of a coating for each respective location of the plurality of locations on component 12 (116). The locations may correspond to the target trajectory points defined in step (114) or may be different. In some examples, the respective target coating thickness may be based on a target coated component geometry and a measured geometry of the component. For example, similar to the discussion above, the technique may include determining, by computing device 30 and, more particularly, geometry analysis module 52, for each respective location of the plurality of locations (which represent points on the surface(s) of component 12 (e.g., a respective x-, y-, z-axis coordinate in a three-coordinate system)), a difference between a measured geometry and a target geometry. In some examples, determining the respective target coating thickness of the coating for each respective location of the plurality of locations on component 12 (116) may include registering, by computing device 30, for example, geometry analysis module 52, the measured geometry to the target geometry, to facilitate determining the differences between the measured geometry and the target geometry for each location. In some examples, computing device 30, for example, geometry analysis module 52, may determine the respective difference for each respective location of the plurality of locations in a direction substantially normal to the measured surface of component 12 at the respective location.

After optionally determining the target thickness (116), the technique illustrated in FIG. 5 may include determining, by computing device 30, for example, spray law module 54, a respective motion vector of coating device 22 relative to component 12 for each first target trajectory point of the plurality of first target trajectory points and each second target trajectory point of the plurality of second target trajectory points to define a path of coating device 22 (118). Each target trajectory point of the plurality of target trajectory points may be associated with a respective motion vector, which defines a target velocity and direction of movement for coating device 22 at the respective target trajectory point. For example, when coating device 22 (e.g., a plume of the spray gun) enters a first target region defined by a first target trajectory point, computing device 30, for example, coating device control module 60, may control coating device 22 to move in a selected direction at a selected velocity toward a second target trajectory point. This process may be repeated for the plurality of target trajectory points to define each target trajectory of a plurality of target trajectories. In this way, the technique of FIG. 5 includes defining a path of travel of coating device 22 relative to component 12. Computing device 30, e.g., spray law module 54, may determine velocity at each target trajectory point as described above, e.g., in step (76) of FIG. 3.

In some examples, the technique illustrated in FIG. 5 also includes determining, by computing device 30, for example, spray law module 54, a number of passes that coating device 22 will travel over each location of the plurality of locations to deposit the target thickness of the coating at each location of component 12.

In some examples, at least one of the determined target trajectories, the determined motion vector, and, in some examples, the determined number of passes, may define a coating program for coating component 12 including at least one coating device path, such as a plurality of coating device paths. A first respective path of the plurality of paths may direct a coating material to the same portion, different portions, or one or more overlapping portions of component 12, compared to other respective paths of the plurality of paths.

In some examples, determining the coating program may include determining, by computing device 30, for example, spray law module 54, at least one of the target trajectories, the motion vector, and the number of passes based on a predetermined template coating program. In some examples, the predetermined template program may define parameters for a coating process and may be experimentally verified. In some examples, one or more of these parameters may be fixed, and computing device 30 may change one or more of the target trajectories, the motion vector, and the number of passes. In some examples, the predetermined template program may include a plurality of subroutines. In some examples, the predetermined template program may be written in any suitable programming language (e.g., C/C++, Python, Java, C#/.NET, MATLAB, Assembly, Hardware Description Languages (HDLs), LISP, industrial robot languages, BASIC/Pascal, or the like). In some examples, computing device 30, for example, spray law adjustment module 56, may adjust one or more parameters of the predetermined template program or parameters of a coating process to arrive at a coating program for applying a coating to deposit the target coating thickness to component 12. For example, computing device 30, for example, spray law module 54, may determine a respective number of passes of coating device 22 for each location of component 12. In some examples, computing device 30, for example, spray law module 54, may determine a number of passes for each location of component 12 by determining a respective number of times each respective subroutine of a predetermined template program is to be executed or performed (e.g., a subroutine count).

In some examples, computing device 30, for example, spray law adjustment module 56, may utilize a non-linear optimization technique to determine at least one of the target trajectories, the motion vector, the velocity, and the number of passes. For example, computing device 30, for example, spray law adjustment module 56, may perform an optimization using the L-BFGS-B nonlinear optimization algorithm (a limited-memory Broyden-Fletcher-Goldfarb-Shanno approximation that handles bound constraints on variables). In some examples, part of the optimization may include executing, by computing device 30, for example, spray law adjustment module 56, a simulation of the coating process based on the geometry of component 12 and at least one spray law.

After determining the motion vectors, the technique may include controlling, by computing device 30, for example, coating device control module 54, control coating device 22 to coat component 12 based on the predetermined template coating program (120). For example, computing device 30 may control coating device 22 to direct a coating material to a surface of component 12 based on the determined motion vectors. In this way, computing device 30 may be configured to coat the surface(s) of component 12 to substantially achieve a target thickness for each respective location of the plurality of locations on component 12.

In some examples, one or more spray laws may receive additional process calibration to account for variability in coating accumulation due to effects that are otherwise unaccounted for in the spray laws, such as effects that are not related to geometry of the substrate, coating process parameters, and the like. Some unaccounted-for effects include, but are not limited to, fixture effects, such as aerodynamics of the different portions of the surface of the component or thermodynamic effects (e.g., heat loss) at the different portions of the surface of the component, or spray booth effects, such as arrangement of a component within a coating system. Accounting for these effects may improve consistency of coating applications between components coated in a single coating process run, between components in multiple coating process runs on the same coating system, and between components coating in different coating systems.

Figure 8:
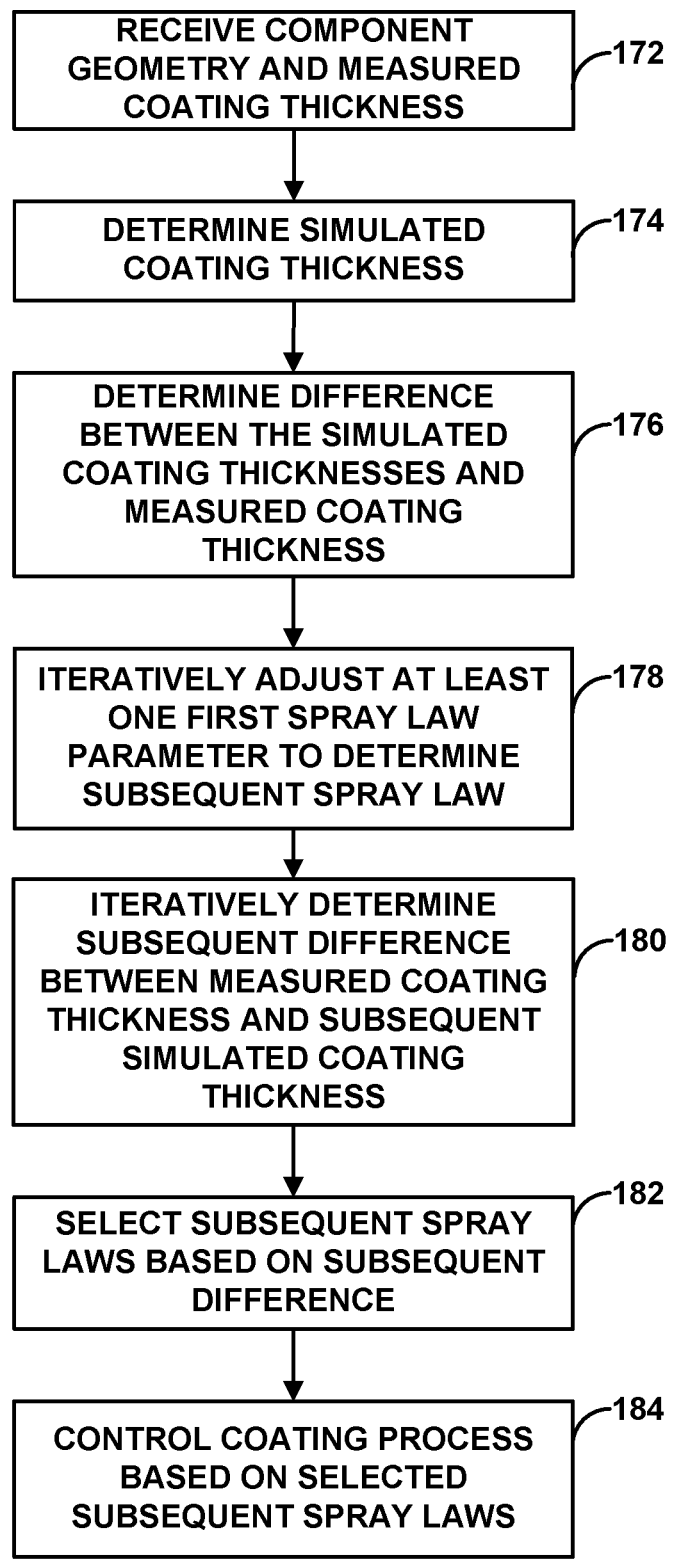
FIG. 8 is a flow diagram of an example technique for controlling a thickness of a coating applied to a component using a comparison to a measured coating thickness.

FIG. 8 is a flow diagram of an example technique for controlling a thickness of a coating applied to a component 12 using a comparison to a measured coating thickness. Although the technique of FIG. 8 will be described with respect to system 10 of FIG. 1 and computing device 30 of FIG. 2, in other examples, the technique of FIG. 8 may be performed using a different system, a different computing device, or both. Additionally, system 10 and computing device 30 may perform other techniques for controlling a thickness of a coating applied to a component using target trajectory points.

The technique illustrated in FIG. 8 includes receiving, by computing device 30, for example, geometry acquisition module 50, a geometry of component 12 in an uncoated state and a measured coating thickness of a test component in a coated state (172). Receiving the geometry of component 12 and the measured coating thickness of the test component may be the same or substantially similar as described above with respect to FIG. 3, except that computing device 30 receives the measured coating thickness of the test component. In some examples, the test component is coated by coating device 22. A geometry of the test component in an uncoated state is substantially similar to the geometry of component 12 in an uncoated state. In this way, the measured coating thickness of the test component may be representative of a coating applied to component 12 by coating device 22. The measured coating thickness of the test component may include any resolution of locations on the surface of the coated test component. For example, the coating thickness may be measured at a predetermined number of locations of the test component. The predetermined number of locations may be relatively few, e.g., between 1 and 10 locations, or relatively many, e.g., tens, hundreds, or thousands of locations.

The technique illustrated in FIG. 8 also includes determining, by computing device 30, for example, spray law module 54, a simulated coating thickness based on the geometry and a first spray law comprising a plurality of first spray law parameters (174). For example, computing device 30 may use spray law module 54 to simulate coating accumulation on component 12 using a first spray law or a first plurality of spray laws and the measured geometry of component 12. As discussed above, the first spray law or each spray law of the first plurality of spray laws may include at least one respective first spray law parameter. In some examples, computing device 30, e.g., spray law module 54, may simulate the coating thickness at each location at which the coating thickness on the test component was measured. In other examples, computing device 30, e.g., spray law module 54, may simulate the coating thickness at fewer or more locations than the number of locations at which the coating thickness on the test component was measured.

In some examples, the technique may include, before determining the simulated coating thickness (174), defining, by computing device 30, for example, geometry acquisition module 50, a plurality of component geometry regions of component 12 and a plurality of test component geometry regions of a test component corresponding to the plurality of component geometry regions. For example, the plurality of component geometry regions may include two or more regions of the geometry of component 12, such as six component geometry regions. In examples in which the geometry includes a plurality of locations on a surface of the component, each respective component geometry region of the plurality of component geometry regions may correspond to a respective location of the plurality of locations. The number and locations of the plurality of test component geometry regions may correspond to the number and locations of the plurality of component geometry regions to enable computing device 30 to associate a measured thickness of each respective test component geometry region of the plurality of test component geometry regions to each respective component geometry region of the plurality of component geometry regions.

In examples in which computing device 30 defines a plurality of component geometry regions of component 12 and a plurality of test component geometry regions of a test component, the technique illustrated in FIG. 8 may be performed for each region of the plurality of component geometry regions. For example, determining the simulated coating thickness (174), determining the difference (176, discussed below), iteratively adjusting the at least one first spray law parameter (178, discussed below), determining the respective subsequent difference (180, discussed below), selecting the subsequent spray law (182, discussed below), and controlling the coating process (184, discussed below) is performed for each region of the plurality of component geometry regions.

In some examples, the plurality of spray law parameters may include a sticking factor. based on a difference between the simulated coating thicknesses and the measured coating thickness. The sticking factor may be an independent factor in a spray law that accounts for fixture effects, spray booth effects, or other factors or combinations of factors that affect coating accumulation. For example, the sticking factor may be indicative of an amount of the simulated coating thickness applied to component 12 when the coating process is controlled using the spray law.

In some examples, the sticking factor includes a plurality of sticking factors and the difference in coating thickness includes a plurality of differences in coating thickness. For example, each respective sticking factor of the plurality of sticking factors may be based on a respective difference of the plurality of differences in coating thickness. Each respective sticking factor of the plurality of sticking factors (and each respective difference of the plurality of differences) may correspond to at least one of a respective location of the plurality of locations of the measured geometry of component 12, a respective geometry region of the plurality of geometry regions of the measured geometry of component 12, or a respective position of the plurality of positions of a predetermined template coating program.

In some examples, the sticking factors may be determined for more locations than the differences in coating thickness. For example, computing device 30, e.g., geometry analysis module 52, may determine a sticking factor for a position between two locations of the measured geometry of component 12. Computing device 30, e.g., geometry analysis module 52, may interpolate the sticking factor from respective sticking factors for the two locations. Similarly, computing device 30, e.g., geometry analysis module 52, may extrapolate a sticking factor corresponding to a position not on the surface of the component from a sticking factor for an adjacent location of the measured geometry of component 12. In this way, computing device 30, e.g., geometry analysis module 52, may determine a plurality of sticking factors for any position on or near a surface of component 12. Computing device 30, e.g., geometry analysis module 52, may perform interpolation or extrapolation for a respective difference of the plurality of differences, or using the plurality of regions of the measured geometry of component 12 or the plurality of positions of a predetermined template coating program.

After determining the simulated coating thickness (174), the technique illustrated in FIG. 8 includes determining, by computing device 30, for example, geometry analysis module 52, a difference between the simulated coating thicknesses and the measured coating thicknesses (176). For example, the difference may be determined for each location of a plurality of locations, each position of a plurality of positions, or each region of a plurality of regions.

In some examples, although not illustrated in FIG. 8, the technique may include determining, by computing device 30, for example threshold analysis module 58, whether the first spray law or the first plurality of spray laws represents the coating process sufficiently accurately. For example, computing device 30, e.g., threshold analysis module 58, may utilize the one or more differences representative of the difference between the simulated coating thicknesses and the measured coating thickness to determine whether the first spray law or the first plurality of spray laws represents the coating process sufficiently accurately. In some examples, computing device 30, for example threshold analysis module 58, may determine a value representative of the difference. In some examples, computing device 30, for example threshold analysis module 58, may manipulate the respective differences to arrive at a single value, as described above. For example, computing device 30, for example, threshold analysis module 58, may compare the single value to a predetermined threshold value to determine whether the accuracy with which the simulated coating thicknesses reflects the measured coating thickness is sufficient for determining coating programs for coating another component. In other examples, computing device 30, for example threshold analysis module 58, may compare each respective difference associated with a respective simulated coating thickness at each respective location of the plurality of locations of the surface of component 12 to a threshold difference value. Computing device 30, for example, threshold analysis module 58, may count a number of differences that exceed the threshold difference value, and compare this count to a threshold count number.

After determining the sticking factor (176), the technique illustrated in FIG. 8 also includes iteratively adjusting, by computing device 30, for example, spray law adjustment module 56, at least one first spray law parameter of the plurality of first spray law parameters to determine (178). In some examples, iteratively adjusting at least one first spray law parameter may include iteratively adjusting a sticking factor to determine a respective subsequent spray law comprising an updated sticking factor. In some examples, adjusting the sticking factor to determine the respective subsequent spray law or plurality of respective subsequent spray laws includes maintaining a number of passes and a coating device velocity between the first spray law and each respective subsequent spray law. In some examples, the respective subsequent spray law or may more accurately represent the coating process by including a more accurate sticking factor. After determining the respective subsequent spray law, although not illustrated in FIG. 8, the technique includes determining, by computing device 30, for example, spray law module 54, a subsequent simulated coating thickness based on the geometry and the respective subsequent spray law or the plurality of respective subsequent spray laws.

After determining the subsequent simulated geometry, the technique may include determining, by computing device 30, for example, spray law module 54, whether the respective subsequent spray law or the plurality of respective subsequent spray laws represents the coating process with sufficient accuracy, similar to the process described above with respect to the simulated geometry. For example, the technique illustrated in FIG. 8 includes iteratively determining, by computing device 30 and, more particularly, geometry analysis module 52, a respective subsequent difference between the measured coating thickness and a subsequent simulated coating thickness based on the geometry and the respective subsequent spray law or the plurality of respective subsequent spray laws (180).

In some examples, the technique includes utilizing, by computing device 30 and, more particularly, spray law adjustment module 54, an optimization algorithm to adjust at least one first spray law parameter of the plurality of first spray law parameters to determine the respective subsequent spray law or the plurality of respective subsequent spray laws. As discussed above, the optimization algorithm may include, for example, a nonlinear optimization algorithm, such as the L-BFGS-B nonlinear optimization algorithm, to reduce (e.g., minimize) an objective function whose inputs include one or more representations of the difference between the simulated coating thickness and the measured coating thickness. In some examples, the technique may include iteratively adjusting at least one first spray law parameter of the plurality of first spray law parameters to determine a respective subsequent spray law or a plurality of respective subsequent spray laws and iteratively determining a respective subsequent difference until a value of the objective function is less than a threshold value or a rate of change in the objective function from one iteration to the next is less than a threshold value.

Once a value of the objective function is less than a threshold value or a rate of change in the objective function from one iteration to the next is less than a threshold value, the technique illustrated in FIG. 8 also includes selecting by computing device 30, for example, threshold analysis module 58, a subsequent spray law or a plurality of subsequent spray laws from the respective subsequent spray laws or the plurality of respective subsequent spray laws based on the respective subsequent differences (182). For example, the technique may include determining, by computing device 30, for example, threshold analysis module 58, that the most recent spray law or most recent plurality of spray laws represents the coating process with sufficient accuracy. In some examples, the selected subsequent spray law or the plurality of respective subsequent spray laws includes the sticking factor. The sticking factor is indicative of an amount of the simulated coating thickness applied to component 12 when the coating process is controlled using the subsequent spray law. For example, the sticking factor may compensate for the difference between the simulated coating thickness of component 12 and the measured coating thickness of the test component. Each respective spray law of the plurality of spray laws may include a respective sticking factor of a plurality of sticking factors and correspond to a respective region of the plurality of regions, such as a respective location of the plurality of locations on the surface of component 12. In this way, each respective sticking factor may represent the sticking factor at a respective location on component 12, such that each respective spray law more accurately represents the coating process at each respective location on component 12. As such, computing device 30 may select different spray laws (including different sticking factors) for different locations of component 12. In some examples, computing device 30 may determine sticking factors based on the differences for a set of locations, then determine sticking factors for intermediate locations using interpolation.

After selecting a subsequent spray law or subsequent spray laws that represent the coating process with sufficient accuracy, the technique illustrated in FIG. 8 also includes controlling, by computing device 30, for example, coating device control module 58, a coating process based on the selected subsequent spray law to compensate for the difference (184). For example, computing device 30, for example, coating device control module 58, may utilize the most recent spray law or most recent plurality of spray laws in future coating processes to compensate for the difference.

EXAMPLES

Gas turbine engine blade track analogs (e.g., "the components") were machined via wire-EDM from low carbon steel for coating using the systems and techniques of this disclosure. The components were grit blasted prior to coating. A F4 MB-XL spray gun using top and bottom injectors, available from Oerlikon Metco, Pfäffikon, Switzerland, was used to apply the coating material. Spray gun movement was controlled by an ABB robot, available from ABB Ltd., Zurich, Switzerland. A bond coating material included Metco 450NS, available from Oerlikon Metco, Pfäffikon, Switzerland. The bond coating material was applied to the components without any coating process adaptation. A top coating material included Metco 2460NS coating, available from Oerlikon Metco, Pfäffikon, Switzerland. The top coating material was applied to the components with coating process adaptation as discussed below.

A spray angle was selected normal to the surface of the component. Components were mounted to a stage of a coating system by seating parts in mounts and clamping the sides of the components. A ladder-style path of travel was selected for the spray gun. For multiple passes, a second ladder-style path was shifted relative to the first ladder-style path by 2.0 millimeters. That is, multiple passes were divided up into odd numbered passes, which were not shifted, and even numbered passes which were shifted 2 millimeters relative to the odd numbered passes. The coating material was the same in all passes. The spray distance was set to 120 millimeters. The distance between consecutive passes was set to 4.0 millimeters.

Figure 9A:
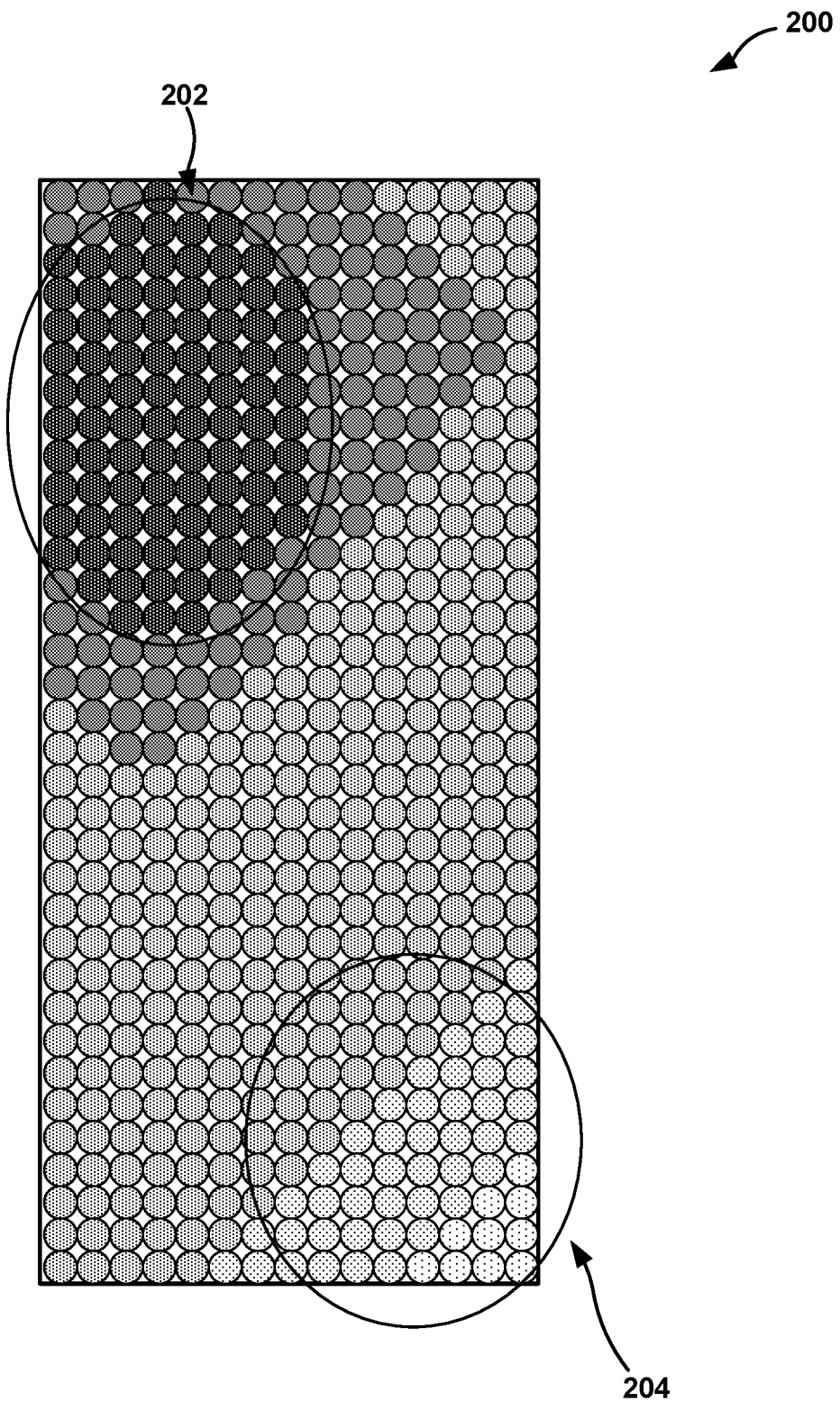
FIGS. 9A and 9B are heat maps illustrating a measured coating thickness of the first component and a simulated coating thickness of the first component based on a geometry of the first component and the first spray program, respectively.
Figure 9B:
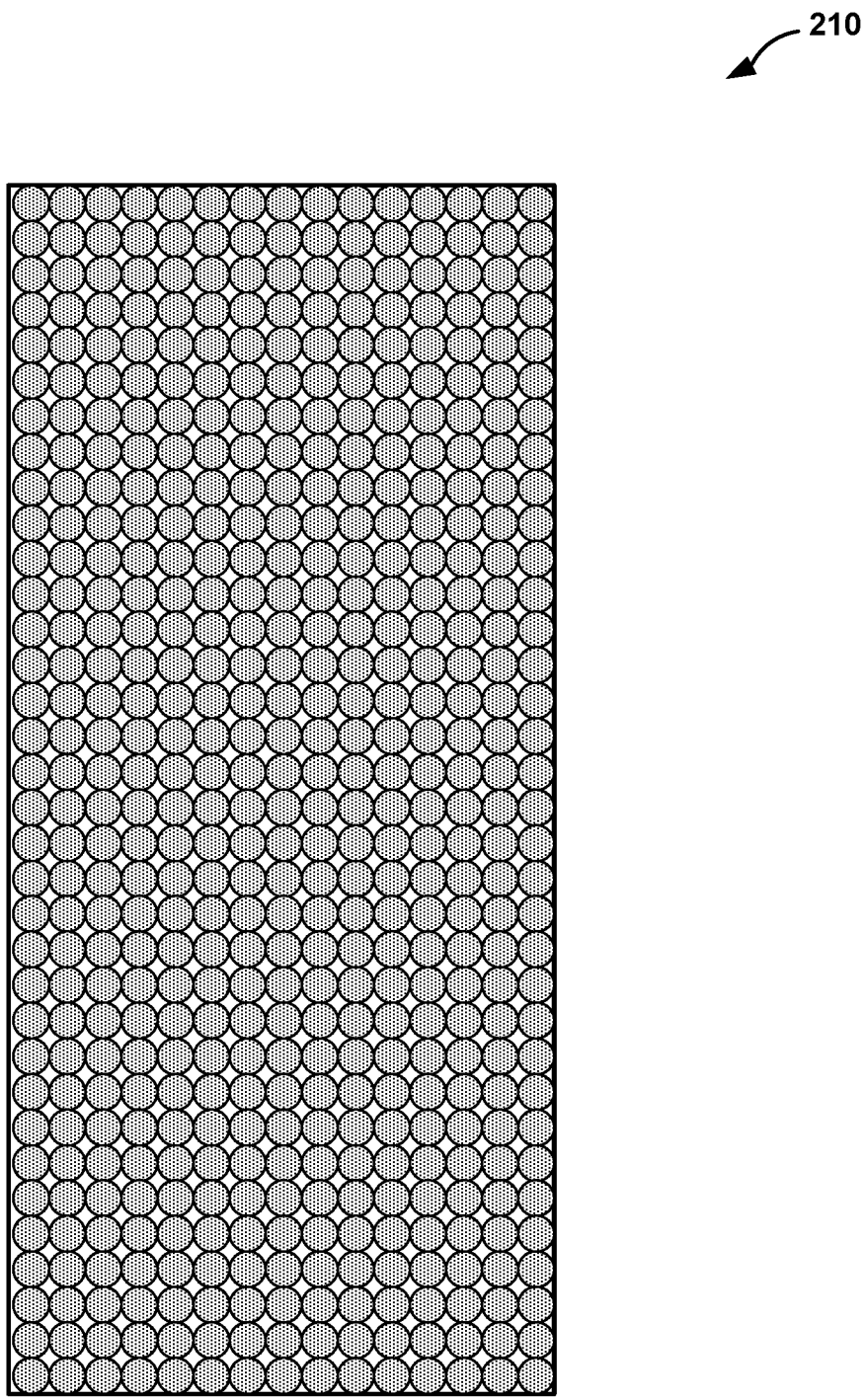

In a first trial, a first spray program including a first spray law was optimized using the technique of this disclosure by adjusting spray gun velocity during each subroutine and the number of passes (e.g., number of times a subroutine was performed) to achieve a target coating thickness of 1.20 millimeters. A coating was applied to a first component using the first spray program. The actual coating thickness was measured using an Aicon sterioSCAN neo, available from Hexagon Manufacturing Intelligence, North Kingstown, R.I., to scan the shape of the part prior to and after applying coating. The measured thickness was found by taking the difference between the two measurement. A difference between the measured coating thickness (e.g., a coating thickness of the test component) and the coating thickness predicted by the first spray program was determined. FIGS. 9A and 9B are heat maps (e.g., shading matrix) illustrating a measured coating thickness 200 of the first component and a simulated coating thickness 210 of the first component based on a geometry of the first component and the first spray program, respectively. The shading in FIGS. 9A and 9B (also FIGS. 10 and 11) is relative to the target coating thickness shown in FIG. 9B. That is, darker shading relative to FIG. 9B indicates a region of thicker coating thickness compared to the target coating thickness, whereas lighter shading (or no shading) indicates a region of thinner coating thickness compared to the target coating thickness. As illustrated in FIGS. 9A and 9B, the measured coating thickness 200 did not match the simulated coating thickness 210. For example, a region in and around a first area 202 was measurably less than the simulated coating thickness 210 and a region in and around a second area 204 was measurably greater than the simulated coating thickness by the first spray program. The difference between the measured coating thickness 200 illustrated in FIG. 9A and the simulated coating thickness 210 illustrated in FIG. 9B may be due to, for example, different thermal conditions, different fixturing, or different aerodynamic conditions when compared to calibration trials. Additionally, the measured coating thickness 200 was generally greater than the target coating thickness of 1.20 millimeters over the majority of the surface of the component.

Figure 10:
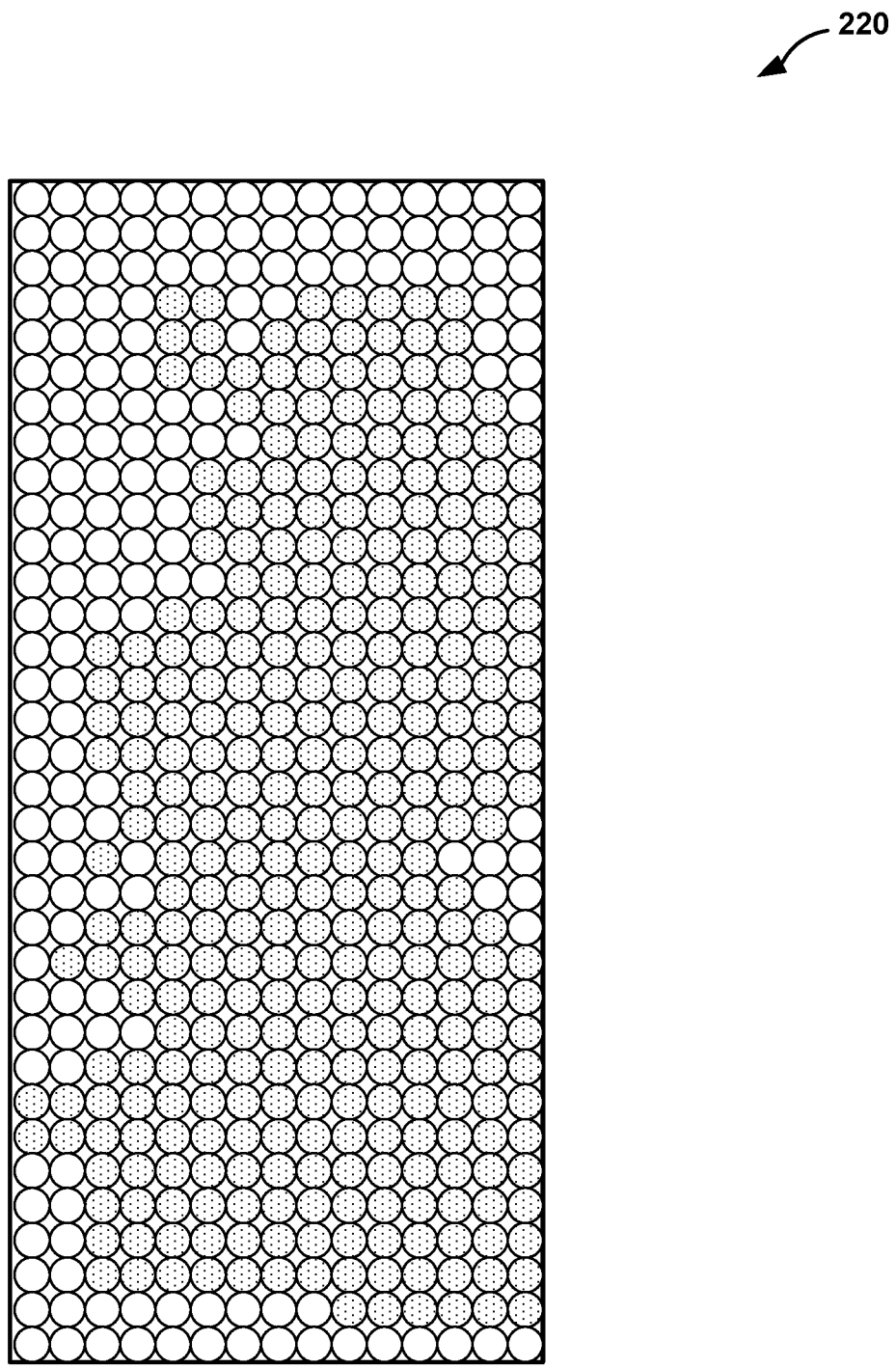
FIG. 10 is a heat map illustrating a measured coating thickness of the second component.

In a second trial, a second spray program including a second spray law was optimized using the techniques of this disclosure. The measured coating thicknesses 200 of the first trial was used as target coating thicknesses for spray law optimization, e.g., such that the simulated coating thickness predicted by the second spray program would better match the measured thickness from the first trail. Additionally, the mounts adjacent to the mount on which a second component was secured were removed from the stage to reduce aerodynamic effects of the adjacent mounts, such as powder reflection effects from the adjacent mounts. FIG. 10 is a heat map illustrating a measured coating thickness 220 of the second component. The measure coating thickness 220 of the second component was less than the target coating thickness of 1.20 millimeters over the entire surface of the component. The mean coating thickness error of the second component was reduced compared to the mean coating thickness error of the first component. Also, the coating thickness standard deviation of the second component was reduced compared to the coating thickness standard deviation of the first component.

Figure 11:
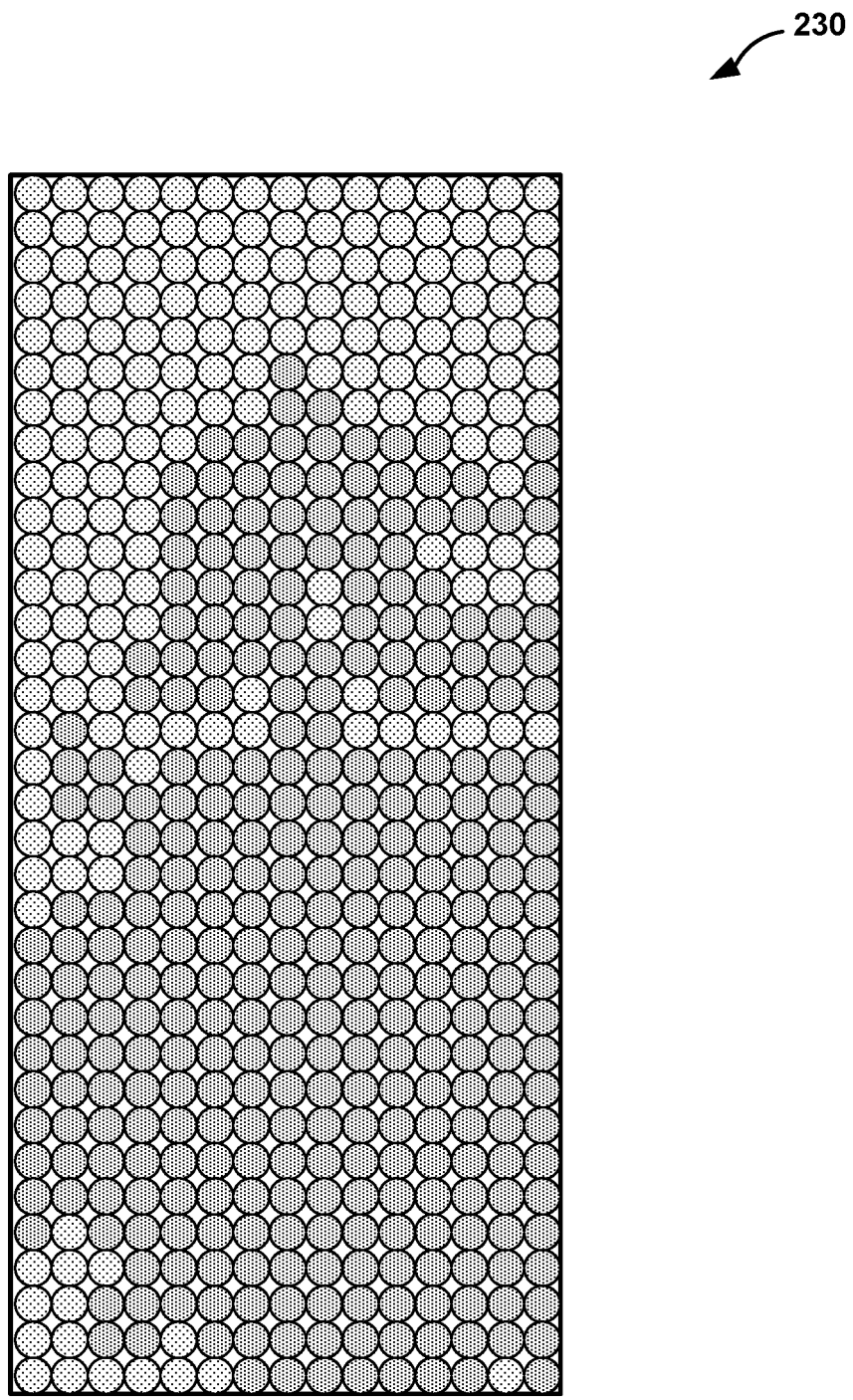
FIG. 11 is a heat map illustrating a measured coating thickness of the third component.

In a third trial, the surface of the third component was conceptually divided into six regions. Also, simulation points not on the surface of the component were introduced to enable the robot to achieve a pre-determined velocity before the coating device reached third component. Additionally, each pass (e.g., target trajectory) was broken in to multiple moves (e.g., target trajectory points) that were spaced 15 millimeters apart, and staggered (e.g., offset) between adjacent passes to increase the spatial resolution with which the system could control coating thickness (e.g., to improve control of coating device velocity). A third spray program including six spray law, one spray law for each of the six regions, was optimized using the techniques of this disclosure. The measured coating thicknesses from the second trial, e.g., for each of six regions of the measured coating thickness corresponding to the six regions of the third component, was used as target coating thicknesses for spray law optimization. Target thickness values for the simulation points were determined based on the measured coating thickness of the second trail using nearest neighbor extrapolation. FIG. 11 is a heat map illustrating a measured coating thickness 230 of the third component. The measure coating thickness 230 of the third component was substantially equal to the target coating thickness of 1.20 millimeters over the majority of the surface of the component. Table 1 summarizes the results of the three trials.

TABLE 1

| Trial | Adaptation | Mean Error (mm) | Standard Deviation (mm) |
|---|---|---|---|
| 1 | None | 0.136 | 0.055 |
| 2 | Adjusted 1 spray law | −0.109 | 0.025 |
| 3 | Adjusted 6 spray laws for each of six regions | 0.003 | 0.030 |

As illustrated in Table 1, trial 3 included a reduction in both mean error of the coating thickness and standard deviation of the coating thickness. Compared to trial 1, trial 3 included a 97.8% reduction in mean error of the coating thickness and a 45.5% reduction in the standard deviation of the coating thickness.

Various examples have been described. These and other examples are within the scope of the following claims.

What is claimed is:

1. A method comprising:
receiving, by a computing device, a geometry of a component, the geometry comprising a plurality of locations on a surface of the component;
determining, by the computing device, a first target trajectory comprising a first plurality of target trajectory points based on the plurality of locations and a second target trajectory comprising a second plurality of target trajectory points based on the plurality of locations, wherein the first trajectory and the second trajectory are offset in a first direction relative to each other, and wherein the plurality of first trajectory points and the plurality of second trajectory points are offset in a second direction relative to each other;
determining, by the computing device, a respective target coating thickness of a coating for each respective location of the plurality of locations based on a target coated component geometry and the geometry of the component; and
determining, by the computing device, a respective motion vector of a coating device relative to the component for each first target trajectory point of the plurality of first trajectory points based on the first target trajectory and each second target trajectory point of the plurality of second target trajectory points based on the second target trajectory to define a path of the coating device to deposit the respective target coating thickness for each respective location.

2. The method of claim 1, further comprising controlling, by the computing device, the coating device based on the respective motion vectors.

3. The method of claim 1, wherein the respective motion vectors are based on a respective spray law of a plurality of spray laws.

4. The method of claim 3, wherein each respective spray law is based on at least one of an amount of the coating applied at each respective location on one or more previous passes, the location of the coating device relative to each respective target trajectory point, the orientation of the coating device relative to each respective target trajectory point, or a predetermined velocity of the coating device.

5. The method of claim 1, wherein the first target trajectory and the second target trajectory are substantially parallel to a first axis, wherein the first direction is substantially perpendicular to the first axis, wherein the second direction is substantially parallel to the first axis.

6. The method of claim 1, wherein the method further comprises determining, by the computing device, a third target trajectory comprising a third plurality of target trajectory points based on the plurality of locations, wherein third trajectory and the second trajectory are offset in the first direction relative to each other, and wherein the third plurality of trajectory points and the plurality of second trajectory points are offset in a second direction relative to each other.

7. The method of claim 1, wherein the method further comprises, before determining the respective motion vector of the coating device, determining, by the computing device, a number of passes of the coating device for each respective target trajectory point of the plurality of target trajectory points to deposit the respective target coating thickness for each respective location, wherein the number of passes are based on a respective spray law of a plurality of spray laws.

8. The method of claim 1, wherein determining the respective motion vector comprises determining, by the computing device, a respective coating subroutine of a plurality of coating subroutines defining a path of travel of the coating device, a velocity of travel of the coating device, and an orientation of the coating device for coating a portion of the component.

9. The method of claim 1, wherein determining the respective motion vector comprises reducing a value of an objective function based on at least one of an error value representing respective differences between the target coated component geometry and the simulated geometry of the component for each location, a time to form the coating, or a total acceleration experienced by the coating device while applying the coating.

10. The method of claim 1, wherein the component comprises a ceramic component or a ceramic matrix composite (CMC) component.

\* \* \* \* \*